US012559616B2

(12) United States Patent
Takata et al.

(10) Patent No.: US 12,559,616 B2
(45) Date of Patent: Feb. 24, 2026

(54) CURABLE RESIN COMPOSITION, CURED PRODUCT, DIFFRACTIVE OPTICAL ELEMENT, AND MULTILAYER DIFFRACTIVE OPTICAL ELEMENT

(71) Applicant: FUJIFILM Corporation, Tokyo (JP)

(72) Inventors: Masahiro Takata, Kanagawa (JP); Masashi Ono, Kanagawa (JP); Naozumi Shiraiwa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 943 days.

(21) Appl. No.: 17/668,351

(22) Filed: Feb. 9, 2022

(65) Prior Publication Data

US 2022/0298348 A1 Sep. 22, 2022

(30) Foreign Application Priority Data

Mar. 17, 2021 (JP) ................................ 2021-043194

(51) Int. Cl.

*C08L 33/08* (2006.01)
*C08K 3/22* (2006.01)
*G02B 1/04* (2006.01)
*G02B 1/111* (2015.01)
*G02B 1/14* (2015.01)

(52) U.S. Cl.

CPC ................ *C08L 33/08* (2013.01); *C08K 3/22* (2013.01); *G02B 1/041* (2013.01); *G02B 1/111* (2013.01); *G02B 1/14* (2015.01); *C08K 2003/2231* (2013.01); *C08K 2201/005* (2013.01); *C08K 2201/011* (2013.01); *C08L 2207/53* (2013.01)

(58) Field of Classification Search

CPC ....... C08L 33/08; C08L 2207/53; G02B 1/14; G02B 1/041; G02B 1/111; C08K 3/22; C08K 2203/2231; C08K 2201/005; C08K 2201/011; C08K 9/02; C08F 2/44; C08F 2/48; C08F 122/1006; C08F 265/06; C08F 292/00

See application file for complete search history.

(56) References Cited

U.S. PATENT DOCUMENTS

| | | | | |
|---|---|---|---|---|
| 2006/0181774 | A1* | 8/2006 | Ojima | G02B 1/111 359/586 |
| 2009/0052040 | A1* | 2/2009 | Suzuki | G02B 5/1847 359/576 |
| 2017/0158821 | A1* | 6/2017 | Todoroki | C08L 83/04 |
| 2021/0395418 | A1 | 12/2021 | Shiraiwa et al. | |

FOREIGN PATENT DOCUMENTS

| | | |
|---|---|---|
| JP | 2006220689 | 8/2006 |
| WO | 2020171197 | 8/2020 |

OTHER PUBLICATIONS

Senthilkumar, V. et al., Structural and optical properties of indium tin oxide (ITO) thin films with different compositions prepared by electron beam evaporation, Vacuum 84.6 (2010): 864-869 (Year: 2010).*

Oliver, J.B. et al., Laser-Induced Damage in Optical Materials: 2005, eds. Exarhos, G. J. et al., Proc. of SPIE 59911A (2005) (Year: 2005).*

"Office Action of Japan Counterpart Application", issued on Aug. 20, 2024, with English translation thereof, pp. 1-6.

* cited by examiner

*Primary Examiner* — Robert S Jones, Jr.
(74) *Attorney, Agent, or Firm* — JCIPRNET

(57) ABSTRACT

Provide are a curable resin composition containing ITO particles, in which a cured product obtained from the curable resin composition can exhibit high transmittance over a visible light to shortwave infrared wavelength region while maintaining a wavelength dependence of a desired refractive index; a cured product formed of the curable resin composition; and a diffractive optical element and a multilayer diffractive optical element.

A curable resin composition includes particles which have a core-shell structure, in which a core portion is composed of indium tin oxide, a monofunctional or higher (meth)acrylate compound, and a dispersant; a cured product formed of the curable resin composition; and a diffractive optical element and a multilayer diffractive optical element.

13 Claims, 1 Drawing Sheet

CURABLE RESIN COMPOSITION, CURED PRODUCT, DIFFRACTIVE OPTICAL ELEMENT, AND MULTILAYER DIFFRACTIVE OPTICAL ELEMENT

CROSS-REFERENCE TO RELATED APPLICATION

The present application claims priority under 35 U.S.C. § 119 to Japanese Patent Application No. 2021-043194, filed on Mar. 17, 2021. The above application is hereby expressly incorporated by reference, in its entirety, into the present application.

BACKGROUND OF THE INVENTION

1. Field of the Invention

The present invention relates to a curable resin composition.

The present invention also relates to a cured product obtained using the curable resin composition, a diffractive optical element, and a multilayer diffractive optical element.

2. Description of the Related Art

By using a diffractive optical element, it is possible to obtain a lens which has a shorter focal length as the wavelength is longer, and exhibits chromatic aberration opposite to that of a refractive lens in the related art. Unlike the refractive lens requiring a plurality of lenses for correcting chromatic aberration, chromatic aberration can be corrected by changing the period of a diffraction structure of a lens, therefore a more compact and high-performance lens unit can be designed by using the diffractive optical element.

In a multilayer diffractive optical element having a structure in which diffractive optical elements formed of two different materials are in contact with each other on lattice planes thereof, by forming one diffractive optical element with a material having a relatively high refractive index and high Abbe number, and forming the other diffractive optical element with a material having a relatively low refractive index and low Abbe number, it is possible to suppress the occurrence of flare in the lens, and the like, and sufficiently utilize a chromatic aberration reducing effect. In this case, in a case where the two diffractive optical elements have optical characteristics in which the difference in refractive index between the two diffractive optical elements is larger at a longer wavelength, the chromatic aberration reducing effect can be obtained in a wide wavelength range.

In recent years, in order to obtain, as described above, the chromatic aberration reducing effect in a wide wavelength range, it has been proposed to add indium tin oxide (ITO) particles to a low Abbe number diffractive optical element in the multilayer diffractive optical element. For example, JP2006-220689A discloses, as a curable resin composition for producing a diffractive optical element, a curable resin composition in which ITO particles are dispersed in a resin containing a photopolymerization initiator, a dispersant, and a mixture of two or more acryloyl groups, methacryloyl groups, or vinyl groups, or unsaturated ethylene groups thereof.

In addition, WO2020/171197A discloses a resin composition including ITO particles and a near-ultraviolet light-absorbing organic compound. According to WO2020/171197A, it is disclosed that, with this resin composition, a cured product, in which a wavelength dependence of a refractive index is adjusted by improving the refractive index on the short wavelength side, and a desired low refractive index and low Abbe number is achieved while suppressing a blending amount of the ITO particles and increasing transmittance in a near infrared wavelength region, is obtained.

SUMMARY OF THE INVENTION

In the related art, since a general camera is supposed to be applied to a lens using a diffractive optical element, as disclosed in JP2006-220689A or WO2020/171197A, research has been conducted to obtain a low Abbe number diffractive optical element which has a wavelength dependence of a desired refractive index and high transmittance in the visible light wavelength region, visible to humans, or the near infrared wavelength region of approximately 1.0 μm from visible light.

On the other hand, in various inspections such as an electronic substrate inspection and a solar cell inspection, a shortwave infrared imaging technique using light in a shortwave infrared wavelength region of approximately 1.0 to 1.7 μm is used. Therefore, in order to obtain chromatic aberration reducing effect in a wide wavelength range from a visible light to shortwave infrared wavelength region to the applied lens, a diffractive optical element having a wavelength dependence of a refractive index and a high transmittance, which is desired as a low Abbe number diffractive optical element, has been required.

The present inventors have repeatedly studied techniques for applying a diffractive optical element which exhibits a wavelength dependence of the refractive index by adding ITO particles to an optical system which utilizes light in the above-described visible light to shortwave infrared wavelength region, and have found that, in the techniques disclosed in JP2006-220689A or WO2020/171197A, it is difficult to achieve high transmittance in the visible light to shortwave infrared wavelength region while maintaining the wavelength dependence of the refractive index due to the addition of ITO particles. In addition, it has been found that, since the curable resin composition disclosed in WO2020/171197A has a low affinity between the near-ultraviolet light-absorbing organic compound and the ITO particles, it is difficult to maintain dispersion stability of the composition for a long period of time. Therefore, a new technology which realizes high transmittance in the visible light to shortwave infrared wavelength region while maintaining the wavelength dependence of the refractive index due to the addition of ITO particles, without using the near-ultraviolet light-absorbing organic compound, has been demanded.

An object of the present invention is to provide a curable resin composition containing ITO particles, in which a cured product obtained from the curable resin composition can exhibit high transmittance over a visible light to shortwave infrared wavelength region while maintaining a wavelength dependence of a desired refractive index. Another object of the present invention is to provide a cured product obtained from the curable resin composition, and a diffractive optical element and a multilayer diffractive optical element including the cured product.

The above-described objects have been achieved by the following methods.

[1]

A curable resin composition comprising:

particles which have a core-shell structure, in which a core portion is composed of indium tin oxide;

a monofunctional or higher (meth)acrylate compound; and a dispersant.

[2]

The curable resin composition according to [1], in which a shell portion is composed of indium tin oxide or indium oxide.

[3]

The curable resin composition according to [1] or [2], in which a tin concentration of whole particles having the core-shell structure is 1.0 to 2.5 at %.

[4]

The curable resin composition according to any one of [1] to [3], in which an absolute value of a difference between a tin concentration of whole particles having the core-shell structure and a tin concentration of a shell portion is 0.5 at % or more.

[5]

The curable resin composition according to any one of [1] to [4], in which a tin concentration of the core portion is 1.5 to 8.0 at %.

[6]

The curable resin composition according to any one of [1] to [5], in which a tin concentration of a shell portion is 0 at % or more and less than 2.0 at %.

[7]

The curable resin composition according to any one of [1] to [6], in which a thickness of a shell portion is 0.5 to 3.0 nm.

[8]

The curable resin composition according to any one of [1] to [7], in which a content of the particles having the core-shell structure in the curable resin composition is 10% to 60% by mass.

[9]

The curable resin composition according to any one of [1] to [8], in which a particle size of the particles having the core-shell structure is 15 to 50 nm.

[10]

The curable resin composition according to any one of [1] to [9], further comprising:

a photoradical polymerization initiator.

[11]

A cured product of the curable resin composition according to any one of [1] to [10].

[12]

A diffractive optical element which is formed of the cured product according to [11], comprising:

a surface having a diffraction grating shape.

[13]

A multilayer diffractive optical element comprising:

a first diffractive optical element; and a second diffractive optical element, in which the first diffractive optical element is the diffractive optical element according to [12], and the surface of the first diffractive optical element, which has a diffraction grating shape, and a surface of the second diffractive optical element, which has a diffraction grating shape, face each other.

In the present invention, the expression of a compound and a substituent is used to include the compound itself and the substituent itself, a salt thereof, and an ion thereof. For example, a carboxy group or the like may have an ionic structure in which a hydrogen atom is dissociated, or may have a salt structure. That is, in the present invention, the "carboxy group" is used in the sense of including a carboxylic acid ion or a salt thereof. This also applies to other acidic groups. A monovalent or polyvalent cation in forming the above-described salt structure is not particularly limited, and examples thereof include inorganic cations and organic cations. In addition, specific examples thereof include alkali metal cations such as $Na^+$, $Li^+$, and $K^+$, alkaline earth metal cations such as $Mg^{2+}$, $Ca^{2+}$, and $Ba^{2+}$, and organic ammonium cations such as a trialkylammonium cation and a tetraalkylammonium cation.

In a case of the salt structure, the type of salt may be one or a mixture of two or more thereof, salt-type and liberated acid-structured groups may be mixed in a compound, or a salt-structured compound and a liberated acid-structured compound may be mixed.

In the present invention, in a case of a plurality of substituents, linking groups, constitutional units, and the like (hereinafter, referred to as a substituent and the like) represented by a specific reference or formula, or in a case of simultaneously defining a plurality of the substituent and the like, unless otherwise specified, the substituent and the like may be the same or different from each other (regardless of the presence or absence of an expression "each independently", the substituent and the like may be the same or different from each other). The same applies to the definition of the number of substituents and the like. In a case where a plurality of substituents and the like are near (particularly, adjacent to each other), unless otherwise specified, the substituents and the like may be linked to each other to form a ring. In addition, unless otherwise specified, a ring, for example, an alicyclic ring, an aromatic ring, or a heterocyclic ring may be further condensed to form a fused ring.

In the present invention, unless otherwise specified, with regard to a double bond, in a case where E-form and Z-form are present in the molecule, the double bond may be any one of these forms, or may be a mixture thereof.

In addition, in the present invention, unless otherwise specified, in a case where a compound has one or two or more asymmetric carbons, for such stereochemistry of asymmetric carbons, either an (R)-form or an (S)-form can be independently taken. As a result, the compound may be a mixture of optical isomers or steric isomers such as diastereoisomers, or may be racemic.

In addition, in the present invention, the expression of the compound means that a compound having a partially changed structure is included within a range which does not impair the effects of the present invention. Further, a compound which is not specifically described as substituted or unsubstituted may have an optional substituent within a range which does not impair the effects of the present invention.

In the present invention, with regard to a substituent (the same applies to a linking group and a ring) in which whether it is substituted or unsubstituted is not specified, within a range not impairing the desired effect, it means that the group may have an optional substituent, and the number of substituents which may be included is not particularly limited. For example, "alkyl group" means to include both an unsubstituted alkyl group and a substituted alkyl group. Similarly, for example, "aryl group" means to include both an unsubstituted aryl group and a substituted aryl group.

In the present invention, in a case where the number of carbon atoms in a certain group is specified, the number of carbon atoms means the number of carbon atoms in the entire group, unless otherwise specified in the present invention or the present specification. That is, in a case of an aspect in which the group has a substituent, it means the total number of carbon atoms including the substituent.

In the present invention, a numerical range represented by using "to" means a range including numerical values described before and after "to" as a lower limit value and an upper limit value.

In the present invention, each component may be used alone or in combination of two or more thereof.

In a description of the content of each component in the curable resin composition of the present invention, in a case where the curable resin composition includes a solvent, the content of each component is based on the component composition obtained by removing the solvent from the curable resin composition. For example, in a case where a curable resin composition is composed of 20 parts by mass of a solvent, 40 parts by mass of a component A, and 40 parts by mass of a component B, for a total of 100 parts by mass, since the content of the component A in the composition is based on 80 parts by mass excluding the solvent, the content thereof is 50% by mass.

In the present invention, "(meth)acrylate" represents either one or both of acrylate and methacrylate, and "(meth) acryloyl" represents either one or both of acryloyl and methacryloyl. The monomer in the present invention is distinguished from an oligomer and a polymer, and refers to a compound having a weight-average molecular weight of 1000 or less.

In the present invention, the term aliphatic hydrocarbon group means a group obtained by removing one optional hydrogen atom from a linear or branched alkane, a linear or branched alkene, or a linear or branched alkyne. In the present invention, the aliphatic hydrocarbon group is preferably an alkyl group obtained by removing one optional hydrogen atom from a linear or branched alkane.

Examples of the alkyl group include a methyl group, an ethyl group, a propyl group, an isopropyl group, a butyl group, an isobutyl group, a sec-butyl group, a tert-butyl group, a pentyl group, an 1-methylbutyl group, a 3-methylbutyl group, a hexyl group, an 1-methylpentyl group, a 4-methylpentyl group, a heptyl group, an 1-methylhexyl group, a 5-methylhexyl group, a 2-ethylhexyl group, an octyl group, an 1-methylheptyl group, a nonyl group, an 1-methyloctyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group.

In addition, in the present invention, the aliphatic hydrocarbon group (unsubstituted) is preferably an alkyl group having 1 to 20 carbon atoms, and more preferably an alkyl group having 1 to 12 carbon atoms.

In the present invention, the term alkyl group means a linear or branched alkyl group. Examples of the alkyl group include the above-described examples. The same applies to an alkyl group in a group (an alkoxy group, an alkoxycarbonyl group, an acyl group, and the like) including the alkyl group.

In addition, in the present invention, examples of a linear alkylene group include a group obtained by removing one hydrogen atom bonded to a terminal carbon atom from a linear alkyl group among the above-described alkyl groups.

In the present invention, the term alicyclic hydrocarbon ring means a saturated hydrocarbon ring (cycloalkane). Examples of the alicyclic hydrocarbon ring include cyclopropane, cyclobutane, cyclopentane, cyclohexane, cycloheptane, cyclooctane, cyclononane, and cyclodecane.

In the present invention, the term unsaturated hydrocarbon ring means a hydrocarbon ring having a carbon-carbon unsaturated double bond, which is not an aromatic ring. Examples of the unsaturated hydrocarbon ring include indene, indane, and fluorene.

In the present invention, the term alicyclic hydrocarbon group means a cycloalkyl group obtained by removing one optional hydrogen atom from a cycloalkane. Examples of the alicyclic hydrocarbon group include a cyclopropyl group, a cyclobutyl group, a cyclopentyl group, a cyclohexyl group, a cycloheptyl group, a cyclooctyl group, a cyclononyl group, and a cyclodecyl group, and a cycloalkyl group having 3 to 12 carbon atoms is preferable.

In the present invention, a cycloalkylene group refers to a divalent group obtained by removing two optional hydrogen atoms from a cycloalkane. Examples of the cycloalkylene group include a cyclohexylene group.

In the present invention, the term aromatic ring means either one or both of an aromatic hydrocarbon ring and an aromatic hetero ring.

In the present invention, the term aromatic hydrocarbon ring means an aromatic ring in which a ring is formed only by carbon atoms. The aromatic hydrocarbon ring may be a monocyclic ring or a fused ring. Examples of the aromatic hydrocarbon ring include benzene, biphenyl, biphenylene, naphthalene, anthracene, and phenanthrene. In the present invention, in a case where the aromatic hydrocarbon ring is bonded to another ring, it is sufficient that the aromatic hydrocarbon ring may be substituted on the another ring as a monovalent or divalent aromatic hydrocarbon group.

In addition, in the present invention, the unsubstituted aromatic hydrocarbon ring is preferably an aromatic hydrocarbon ring having 6 to 14 carbon atoms.

In the present invention, the term monovalent aromatic hydrocarbon group (also referred to as an aryl group) means a monovalent group obtained by removing one optional hydrogen atom from the aromatic hydrocarbon ring. Examples of the monovalent aromatic hydrocarbon group include a phenyl group, a biphenyl group, an 1-naphthyl groups, a 2-naphthyl groups, an 1-anthracenyl group, a 2-anthracenyl group, a 3-anthracenyl group, a 4-anthracenyl group, a 9-anthracenyl group, an 1-phenanthryl group, a 2-phenanthryl group, a 3-phenanthryl group, a 4-phenanthryl group, and a 9-phenanthryl group. Among these, a phenyl group, an 1-naphthyl group, or a 2-naphthyl group is preferable.

In the present invention, the term divalent aromatic hydrocarbon group means a divalent group obtained by removing two optional hydrogen atoms from the aromatic hydrocarbon ring. Examples of the divalent aromatic hydrocarbon group include a divalent group obtained by removing one optional hydrogen atom from the above-described monovalent aromatic hydrocarbon group. Among these, a phenylene group is preferable, and an 1,4-phenylene group is more preferable.

In the present invention, the term aromatic heterocyclic ring means an aromatic ring in which a ring is formed by at least one heteroatom and an atom selected from a carbon atom or a heteroatom. Examples of the heteroatom include an oxygen atom, a nitrogen atom, and a sulfur atom. The aromatic heterocyclic ring may be a monocyclic ring or a fused ring, and the number of atoms constituting the ring is preferably 5 to 20 and more preferably 5 to 14. The number of heteroatoms in the atoms constituting the ring is not particularly limited, but is preferably 1 to 3 and more preferably 1 or 2. Examples of the aromatic heterocyclic ring include furan, thiophene, pyrrole, imidazole, isothiazole, isoxazole, pyridine, pyrazine, quinoline, benzofuran, benzothiazole, benzoxazole, and examples of nitrogen-containing fused aromatic ring described later. In the present invention, in a case where the aromatic heterocyclic ring is bonded to another ring, it is sufficient that the aromatic heterocyclic ring may be substituted on the another ring as a monovalent or divalent aromatic heterocyclic group.

In the present specification, the term monovalent aromatic heterocyclic group (also referred to as a heteroaryl group) means a monovalent group obtained by removing one optional hydrogen atom from the aromatic heterocyclic ring. Examples of the monovalent aromatic heterocyclic group include a furyl group, a thienyl group (preferably, a 2-thienyl group), a pyrrolyl group, an imidazolyl group, an isothiazolyl group, an isooxazolyl group, a pyridyl group, a pyrazinyl group, a quinolyl group, a benzofuranyl group (preferably, a 2-benzofuranyl group), a benzothiazolyl group (preferably, a 2-benzothiazolyl group), and a benzoxazolyl group (preferably, a 2-benzoxazolyl group). Among these, a furyl group, a thienyl group, a benzofuranyl group, a benzothiazolyl group, or a benzoxazolyl group is preferable, and a 2-furyl group or a 2-thienyl group is more preferable.

In the present invention, the term divalent aromatic heterocyclic group means a divalent group obtained by removing two optional hydrogen atoms from the aromatic heterocyclic ring. Examples of the divalent aromatic heterocyclic group include a divalent group obtained by removing one optional hydrogen atom from the above-described monovalent aromatic heterocyclic group.

In the present invention, examples of a halogen atom include a fluorine atom, a chlorine atom, a bromine atom, and an iodine atom.

The curable resin composition of the present invention is a curable resin composition containing ITO particles, with which a cured product that exhibits high transmittance over a visible light to shortwave infrared wavelength region while maintaining a wavelength dependence of a desired refractive index can be obtained.

In addition, the cured product of the present invention can exhibit high transmittance over a visible light to shortwave infrared wavelength region while maintaining a wavelength dependence of a desired refractive index, and can be suitably used for a diffractive optical element and a multilayer diffractive optical element.

DESCRIPTION OF THE PREFERRED EMBODIMENTS

Curable Resin Composition

Figure 1:
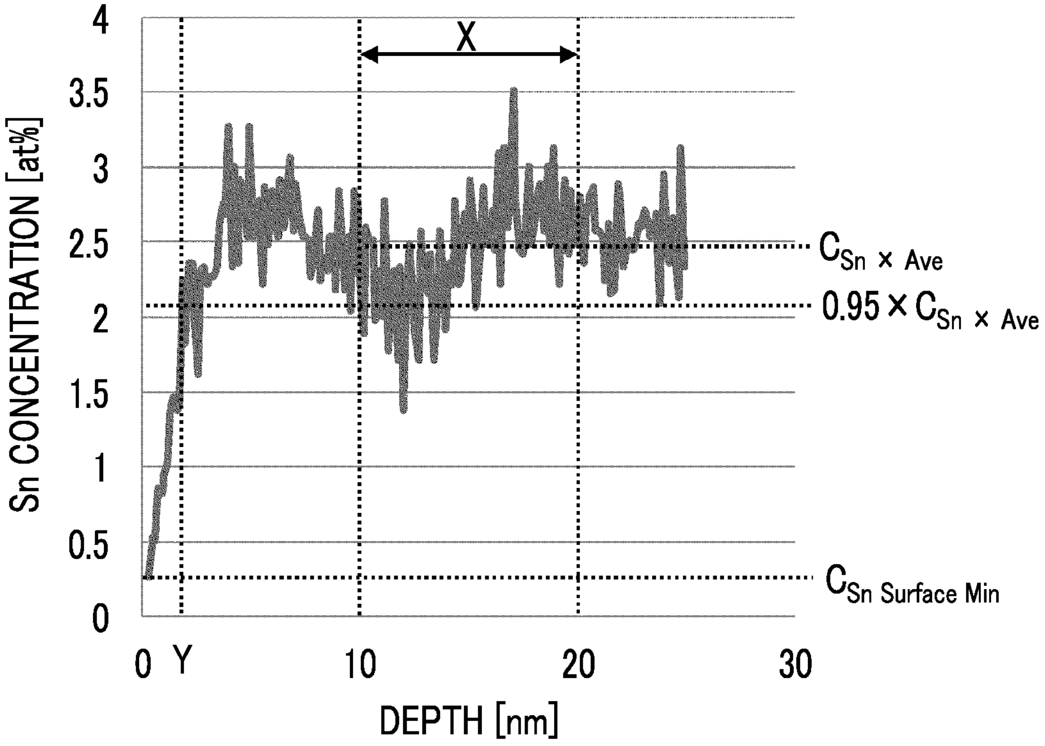
FIG. 1 is an example of a TOF-SIMS graph relating to core-shell ITO particles used in the present invention. In the graph of FIG. 1, a horizontal axis shows a depth and a vertical axis shows a tin concentration.

A curable resin composition according to an embodiment of the present invention includes at least particles which have a core-shell structure, in which a core portion is composed of indium tin oxide, a monofunctional or higher (meth)acrylate compound, and a dispersant.

The curable resin composition according to the embodiment of the present invention means a composition which has curing properties and with which a cured product (resin) can be obtained by curing.

The curable resin composition according to the embodiment of the present invention may include other components in addition to these components. Hereinafter, each component will be described.

Core-Shell ITO Particles

The curable resin composition according to the embodiment of the present invention contains particles (in the present invention, also referred to as "core-shell ITO particles") which have a core-shell structure, in which a core portion is composed of indium tin oxide (ITO).

By using such core-shell ITO particles as the indium tin oxide particles contained in the curable resin composition, as disclosed in JP2006-220689A, it is possible to obtain a cured product in which a decrease in transmittance in the shortwave infrared wavelength region (NIR), which occurs in a case where particles (hereinafter, also referred to as "homogeneously doped ITO particles") having a homogeneous tin concentration of ITO constituting the particles are added, is suppressed. This is because that, by forming the ITO particles into a core-shell structure, it is possible to adjust absorption to be sharper while maintaining absorption wavelength indicated by the homogeneously doped ITO particles. Therefore, it is considered that the absorption of ITO particles applied to NIR in the base of absorption is reduced and the transmittance in NIR is improved.

Core-Shell Structure

In the present invention, the "particles which have a core-shell structure, in which a core portion is composed of ITO" means particles in which the core portion is composed of ITO, and (i) a shell portion is composed of a compound different from ITO or (ii) a shell portion is composed of ITO having a tin concentration different from that of the core portion.

With regard to (i) the particles in which the core portion is composed of ITO and a shell portion is composed of a compound different from ITO described above, the core portion can be produced using an ITO precursor solution and the shell portion can be produced using a precursor solution of the compound different from ITO. In addition, with regard to (ii) the particles in which the core portion is composed of ITO and a shell portion is composed of ITO having a tin concentration different from that of the core portion described above, the shell portion and the core portion can be produced using, as a precursor solution, precursor solutions with different tin concentrations.

In a case where the shell portion is composed of a compound different from both indium oxide and ITO, it can be confirmed that the particles have a core-shell structure by confirming that the shell portion has atoms other than an oxygen atom, an indium atom, and a tin atom and is composed of a compound different from ITO by a depth direction analysis of the particles by TOF-SIMs described later. For example, in a case where the shell portion is composed of zinc oxide, it can be confirmed that the maximum value of a zinc concentration near the surface of the particles by the depth direction analysis of TOF-SIMS is 100 at %, and the zinc concentration in a depth range X is almost 0 at %.

On the other hand, in a case where the shell portion is composed of indium oxide or ITO, a particle size of the particles is measured by TEM described later and the tin concentration of the particles in the depth direction is measured by TOF-SIMS described later, and it is confirmed by the following method. In a graph obtained by the measurement of TOF-SIMS, in which the horizontal axis is the depth and the vertical axis is the tin concentration, a case where an absolute value of a difference between an average value $C_{Sn \times Ave}$ of the tin concentration in the depth range X, which is equal to or greater than a depth corresponding to a radius of the particles and is less than or equal to a depth corresponding to a diameter of the particles, and a minimum value $C_{Sn\ Surface\ Min}$ of the tin concentration near the surface of the particles satisfies a relationship of 1.0 at % or more is defined as the particles having a core-shell structure used in the present invention.

In the present invention, the "radius of the particles" is a value obtained by multiplying the particle size measured by TEM by 0.5, and the "near the surface of the particles" means a depth range of 0 to 3.0 nm in the depth direction analysis by TOF-SIMS.

Hereinafter, the details will be described using specific examples.

FIG. 1 shows a graph obtained by a TOF-SIMS measurement of core-shell ITO particles having a particle size of 20 nm by a TEM measurement, the core-shell ITO particles produced using an ITO precursor solution having a tin concentration of 4 at % for the production of the shell portion and an indium oxide precursor solution having a tin concentration of 0 at % for the production of the core portion. In FIG. 1, the average value $C_{Sn \times Ave}$ of the tin concentration in the depth range X from a depth of 10 nm corresponding to the radius of the particles to a depth of 20 nm corresponding to the diameter of the particles is 2.47 at %, and the minimum value $C_{Sn\ Surface\ Min}$ of the tin concentration near the surface of the particles is 0.26 at %. The absolute value of the difference of these values is 2.21 at %, which satisfies 1.0 at % or more, so that the particles shown in FIG. 1 are core-shell ITO particles used in the present invention.

Figure 2:
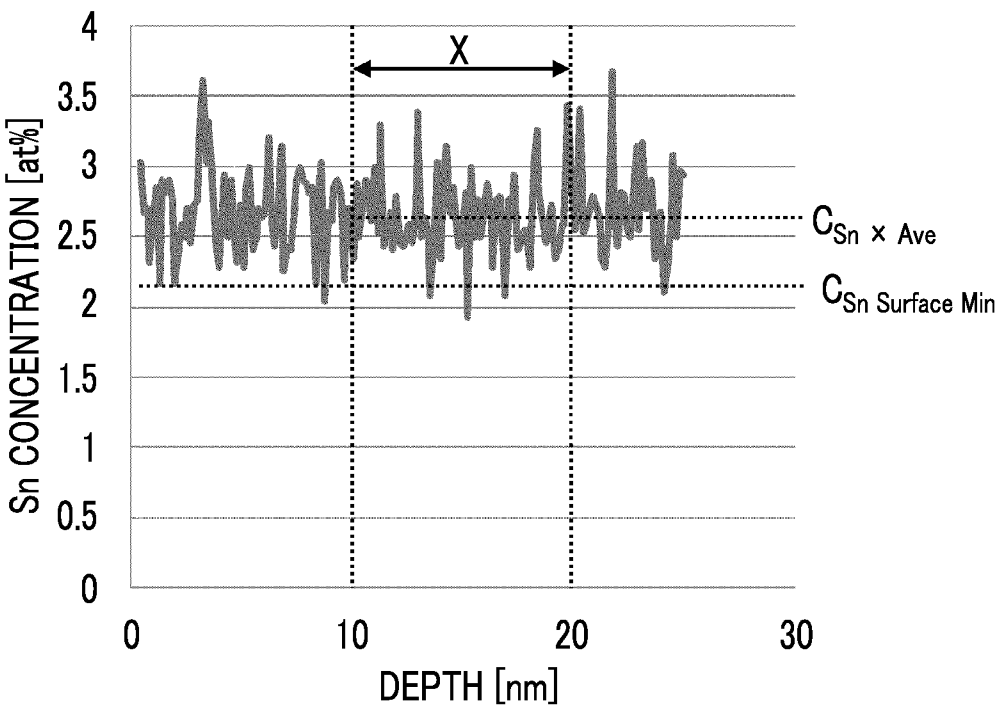
FIG. 2 is an example of a TOF-SIMS graph relating to homogeneously doped ITO particles. In the graph of FIG. 2, a horizontal axis shows a depth and a vertical axis shows a tin concentration.

On the other hand, FIG. 2 shows a graph obtained by a TOF-SIMS measurement of homogeneously doped ITO particles having a particle size of 20 nm by a TEM measurement, the homogeneously doped ITO particles produced using an ITO precursor solution having a tin concentration of 4 at %. As shown in FIG. 2, in the case of homogeneously doped ITO particles prepared with one kind of ITO precursor solution, $C_{Sn \times Ave}$ in the depth range X is 2.66 at % and $C_{Sn\ Surface\ Min}$ is 2.16 at %, and the absolute value of the difference of these values is 0.50 at %, which is not a difference of 1.0 at % or more. That is, it is not the core-shell ITO particles used in the present invention.

Absolute value of difference between tin concentration of whole particles and tin concentration of shell portion A material constituting the shell portion of the core-shell ITO particles is not particularly limited as long as it has the core-shell structure specified in the present invention and the effects of the present invention can be obtained, and may be an organic compound or an inorganic compound. Among these, a metal oxide including one kind or two or more kinds of metal elements is preferable, and from the viewpoint of ease of producing the core-shell ITO particles in which the core portion is composed of ITO, indium oxide or indium tin oxide is more preferable.

In the core-shell ITO particles, the absolute value of a difference between the tin concentration of the whole particles and the tin concentration of the shell portion is preferably 0.5 at % or more, and from the viewpoint of improving transmittance, more preferably 1.0 at % or more. The upper limit value of the absolute value of the difference between the tin concentration of the whole particles and the tin concentration of the shell portion is preferably 20.0 at % or less, more preferably 8.0 at % or less, and still more preferably 4.0 at % or less. From the viewpoint of improving transmittance, it is preferable that the tin concentration of the whole tin particles exceeds the tin concentration of the shell portion.

In the present invention, the tin concentration means a proportion (at %) of the number of tin atoms to the total number of metal atoms. The tin concentration of the core portion and the tin concentration of the shell portion mean the tin concentration for metal atoms constituting the core portion or the shell portion, respectively. For example, in a case of being composed of ITO, the tin concentration is a proportion of the number of tin atoms to the total number of indium atoms and tin atoms.

The tin concentration of the shell portion is calculated from the particle size and tin concentration of the whole core-shell ITO particles, the thickness of the shell portion, and the particle size and tin concentration of the core portion, which are measured and calculated by methods described later.

Each Tin Concentration of Core Portion, Shell Portion, and Whole Particles

In the core-shell ITO particles, from the viewpoint of improving transmittance, it is preferable that the tin concentration of the core portion exceeds the tin concentration of the shell portion.

The tin concentration of the core portion can be, for example, 2.0 to 20 at %, and from the viewpoint of further improving transmittance, is more preferably 1.5 to 8.0 at %, still more preferably 1.5 to 4.0 at %, and particularly preferably 1.5 to 3.5 at %.

The tin concentration of the shell portion is preferably 0 at % or more and less than 2.0 at %, more preferably 0 to 1.0 at %, and still more preferably 0 to 0.5 at %.

The tin concentration of the whole core-shell ITO particles can be, for example, 0.5 to 3.0 at %, and from the viewpoint of further improving transmittance, is preferably 1.0 to 2.5 at % and more preferably 1.0 to 2.0 at %.

The tin concentration of the core portion and the tin concentration of the shell portion in the above-described core-shell ITO particles can be adjusted by the tin concentration in each precursor solution used for producing the core-shell ITO particles.

The tin concentration of the whole particles described above can be adjusted by the tin concentration and thickness of the core portion and the shell portion in the core-shell ITO particles.

Particle Size

The particle size of the core-shell ITO particles can be, for example, 5 to 50 nm, and from the viewpoint of further improving transmittance, is preferably 15 to 50 nm and more preferably 18 to 30 nm. By setting the particle size to the above-described upper limit or less, it is possible to prevent deterioration of transmittance due to Rayleigh scattering. In addition, by setting the particle size to 5 nm or more, it is possible to perform a production of the core-shell ITO particles without technical difficulty. Among these, by setting the particle size to 15 nm or more (more preferably, 18 nm or more), in a case of preparing the curable resin composition according to the embodiment of the present invention, solidification of the composition is unlikely to occur, and a filling rate of the core-shell ITO particles in the composition can be easily increased.

In the present invention, among these, from the viewpoint of further improving transmittance, it is preferable to use core-shell ITO particles which have a particle size of 15 to 50 nm and in which the tin concentration of the core portion is 1.5 to 8.0 at %.

Thickness of Shell Portion and Radius of Core Portion

In the core-shell ITO particles, a ratio of the thickness of the shell portion to the radius of the core portion is not particularly limited as long as the effects of the present invention are exhibited, but for example, is preferably 0.10 to 0.50, more preferably 0.10 to 0.40, and still more preferably 0.15 to 0.35.

The thickness of the shell portion in the core-shell ITO particles can be, for example, 0.5 to 10.0 nm, and from the viewpoint of further improving transmittance, is preferably 0.5 to 3.0 nm and more preferably 0.5 to 2.0 nm.

The diameter of the core portion in the core-shell ITO particles can be obtained as a difference by using the particle size of the core-shell ITO particles and the thickness of the shell portion, which are obtained by methods described later.

Hereinafter, the methods for measuring and calculating the tin concentration, particle size, and thickness of the core-shell ITO particles will be collectively described. Details of the measurement conditions and the like are as described in Examples described later.

ICP-MS Analysis

The tin concentration of the whole core-shell ITO particles can be measured by Inductively Coupled Plasma Mass Spectrometry (ICP-MS).

In addition, the tin concentration of the core portion can be measured by ICP-MS of the particles at a stage of producing the core portion in a step of producing the core-shell ITO particles. In a case where the core-shell ITO particles are used as a measurement sample, the tin concentration can be evaluated by performing composition analysis near the center of the particles with a highly decomposed Energy Dispersive X-ray Spectroscopy (TEM-EDX).

Depth Direction Analysis by TOF-SIMS

The thickness of the shell portion in the core-shell ITO particles can be calculated by the following method, in which the tin concentration in the depth direction by Time of Flight-SIMS (TOF-SIMS; time of flight mass spectrometry) is measured.

The thickness of the shell portion means a depth which first shows the same tin concentration obtained by multiplying $C_{Sn \times Ave}$ described above by 0.95 in a case of being viewed from 0 nm in the depth direction. More specifically, in the graph of FIG. 1, $0.95 \times C_{Sn \times Ave}$ is 2.10 at %, a depth Y first showing a tin concentration of 2.10 at % in a case of being viewed from 0 nm is 1.7 nm, and a thickness of the shell portion in the core-shell ITO particles is 1.7 nm.

TEM Analysis

The particle size of the core-shell ITO particles can be obtained by averaging the equivalent circle diameters of primary particles, which are measured by a transmission electron microscope (TEM). That is, an area S of the particles is measured for one particle in the electron micrograph taken by TEM, and a diameter of a perfect circle corresponding to this area S (equivalent circle diameter=2 $(S/\pi)^{0.5}$) is obtained. In the present invention, equivalent circle diameters of 500 particles are randomly obtained, and the average value (arithmetic mean) of these 500 equivalent circle diameters is calculated and used as the particle size.

In addition, as the particle size of the core portion, in a step of producing the core-shell ITO particles, a value measured and calculated by the TEM of the particles at the stage of producing the core portion is defined as the particle size, in the same manner as the particle size of the core-shell ITO particles.

In addition, with regard to the tin concentration, particle size, and thickness of the core-shell ITO particles in the cured product, the particles obtained by dissolving the cured product using an alkali solution or the like can also be measured and calculated by ICP-MS, TOF-SIMS, or TEM as described above.

Production of Core-Shell ITO Particles and Preparation of Composition

The curable resin composition according to the embodiment of the present invention is preferably prepared by mixing core-shell ITO particles dispersed in a solvent with a dispersant and a (meth)acrylate compound described later. After mixing, the solvent used for dispersing the core-shell ITO particles may or may not be removed from the curable resin composition by distillation or the like, but it is preferable to be removed.

The dispersibility of the core-shell ITO particles in a solvent can be improved by using surface-modified core-shell ITO particles. The surface modification of the core-shell ITO particles is preferably performed using, for example, a monocarboxylic acid having 6 to 20 carbon atoms as a surface-modified compound. The surface modification of the core-shell ITO particles with a monocarboxylic acid can be performed by a conventional method, and it is preferable that a carboxy group derived from the monocarboxylic acid forms an ester bond with an oxygen atom on the surface of the core-shell ITO particles, or the carboxy group is coordinated with In or Ti atom.

Examples of the monocarboxylic acid having 6 to 20 carbon atoms include oleic acid (having 18 carbon atoms), stearic acid (having 18 carbon atoms), palmitic acid (having 16 carbon atoms), myristic acid (having 14 carbon atoms), and decanoic acid (having 10 carbon atoms), and oleic acid (having 18 carbon atoms) is preferable.

In the curable resin composition, a moiety derived from the surface-modified compound in the core-shell ITO particles (for example, a group derived from a monocarboxylic acid having 6 to 20 carbon atoms) bonded to the ITO particles by the above-described surface modification may be bonded to the core-shell ITO particles as it is, a part thereof may be replaced with a group derived from a dispersant described later, or all may be replaced with groups derived from a dispersant described later. In the curable resin composition according to the embodiment of the present invention, it is preferable that both the moiety derived from the surface-modified compound (for example, a group derived from a monocarboxylic acid having 6 to 20 carbon atoms) and the group derived from the dispersant described later are bonded to the surface of the core-shell ITO particles.

As the solvent, a solvent, in which a constituent (δp) of a polarity element in a solubility parameter (SP value) is 0 to 6 $MPa^{1/2}$, is preferable.

The constituent (δp) of the polarity element in the SP value is a value calculated by the Hansen solubility parameter. The Hansen solubility parameter is constituted of intermolecular dispersive force energy (δd), intermolecular polar energy (δp), and intermolecular hydrogen bonding energy (δh). In the present invention, the Hansen solubility parameter is a value calculated using HSPiP (version 4.1.07) software.

Specifically, the solvent is preferably toluene (1.4), xylene (1.0), or hexane (0), and more preferably toluene. The value in the parentheses is a value of δp, and the unit is $MPa^{(1/2)}$.

A method for producing the core-shell ITO particles is not particularly limited, and for example, the core-shell ITO particles can be produced according to the procedure described in ACS Nano 2016, 10, pp. 6942 to 6951. According to the procedure of the reference, a dispersion liquid of core-shell ITO particles can be obtained, and the surface modification can be performed with reference to the description in the same reference.

Specifically, a solution obtained by mixing a monocarboxylic acid having 6 to 20 carbon atoms, an indium salt (for example, indium acetate), and a tin salt (for example, tin acetate) is added dropwise to an alcohol (long-chain alcohol such as oleyl alcohol) heated to high temperature, and the mixture is retained at high temperature, thereby capable of forming particles.

Thereafter, a poor solvent (lower alcohol such as ethanol) having low polymer solubility is added thereto to precipitate the particles, the supernatant is removed, and the particles are redispersed in the above-described solvent such as toluene, thereby capable of forming a dispersion liquid of surface-modified core-shell ITO particles.

The content proportion of the core-shell ITO particles in the curable resin composition according to the embodiment of the present invention is preferably 10% to 70% by mass, more preferably 10% to 60% by mass, and still more preferably 20% to 50% by mass.

Dispersant

The curable resin composition according to the embodiment of the present invention contains a dispersant for dispersing the core-shell ITO particles in the composition.

As the above-described dispersant, a cationic surfactant, an anionic surfactant, or an amphoteric surfactant can be used.

As the cationic surfactant, it is preferable to have an amine salt type group or a quaternary ammonium salt type group.

As the anionic surfactant, it is preferable to have a carboxy group, a phosphono group ($—PO(OH)_2$), a phosphonooxy group (phosphoric acid group, $—OPO(OH)_2$), a hydrohydroxyphosphoryl group (—PH(O)(OH)), a sulfino group (—SO(OH)), a sulfo group ($—SO_2(OH)$), a sulfanyl group (—SH), or a salt thereof, as an acidic group. The above-described acidic group is more preferably a carboxy group, a phosphono group, a phosphonooxy group, or a salt thereof, and still more preferably a carboxy group or a salt thereof.

Examples of such an anionic surfactant include carboxylic acid type such as a (meth)acrylic acid compound and a hydroxystearic acid compound, phosphoric acid type such as a phosphoric acid compound, sulfonic acid type such as an amido sulfonic acid compound, polycarboxylic acid type such as a poly(meth)acrylic acid, and polyphosphoric acid type anionic surfactants.

Examples of the amphoteric surfactant include amino acid type or betaine type amphoteric surfactants.

An ionic group such as the acidic group in the above-described dispersant functions as the dispersant by exhibiting an adsorption action on the surface of the core-shell ITO particles by at least one of an ionic bond, a covalent bond, a hydrogen bond, or a coordinate bond.

Among these, as the above-described dispersant, an anionic surfactant is preferable.

Specific examples of the above-described dispersant include DISPERBYK series (product name, manufactured by BYK Japan KK) of DISPERBYK-106, 108, 110, 111, 118, 140, 142, 145, 161, 162, 163, 164, 167, 168, 180, 2013, 2055, and 2155, and Phosmer series (product name, manufactured by Unichemical Co., Ltd.) of Phosmer M, Phosmer PE, Phosmer MH, and Phosmer PP.

Acidic Polymer

In addition, preferred examples of the above-described dispersant also include an acidic polymer having the above-described acidic group as an adsorbing group to be adsorbed on the core-shell ITO particles (hereinafter, also referred to as an acidic polymer).

The acidic group included in the acidic polymer is preferably a carboxy group or a salt thereof. The acidic polymer including a carboxy group has higher compatibility with a (meth)acrylate compound described later than, for example, a phosphoric acid-based dispersant having a phosphono group or a phosphonooxy group. Therefore, in a case where a curable resin composition including the acidic polymer having a carboxy group is cured, phase separation or whitening hardly occurs. In addition, in a case of forming a diffraction grating shape, adhesiveness between the resin and the mold is good, and asperity of a peeled surface is less likely to occur due to that curing shrinkage is small. Furthermore, the viscosity is less likely to increase as compared with, for example, an amine-based dispersant having an amine salt type group or a quaternary ammonium salt type group.

The above-described acidic polymer preferably includes a (meth)acrylate polymer skeleton consisting of a (meth)acrylate constitutional unit. By including the (meth)acrylate polymer skeleton, compatibility between the acidic polymer and the (meth)acrylate compound in the curable resin composition can be improved. In addition, it is easy to control the refractive index of the cured product of the curable resin composition.

Examples of the above-described (meth)acrylate constitutional unit include a constitutional unit derived from a (meth)acrylate monomer, described in paragraph 0042 of JP2012-107191A, and a constitutional unit represented by General Formula (P) is preferable.

General Formula (P)

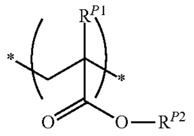

In the formula, $R^{P1}$ represents a hydrogen atom or a methyl group, and $R^{P2}$ represents a monovalent substituent. * represents a bonding portion for incorporation into a polymer main chain.

$R^{P2}$ is preferably an alkyl group or an alicyclic hydrocarbon group, and more preferably an alkyl group. The number of carbon atoms in the alkyl group is preferably 1 to 20, more preferably 1 to 12, still more preferably 1 to 8, particularly preferably 1 to 4, and most preferably 1.

From the viewpoint of preventing the viscosity of the curable resin composition from increasing, it is preferable that the methyl group which can be adopted as $R^{P1}$ and the alkyl group and alicyclic hydrocarbon group which can be adopted as $R^{P2}$ do not include the above-described acidic group as a substituent.

The above-described (meth)acrylate polymer skeleton may be linear or branched. Among these, it is preferable to be linear.

The number of (meth)acrylate constitutional units constituting one (meth)acrylate polymer skeleton is preferably 5 to 50, more preferably 8 to 40, and still more preferably 10 to 30.

The number of (meth)acrylate polymer skeletons included in one molecule of the above-described acidic polymer may be 1 or 2 or more, and for example, is preferably 1 to 6 and more preferably 1 to 4.

The above-described acidic polymer preferably has a moiety including an acidic group in at least one terminal side of the above-described (meth)acrylate polymer skeleton. The "having a moiety including an acidic group in at least one terminal side of the (meth)acrylate polymer skeleton" means that it has a moiety including an acidic group, either directly or through a linking group, to at least one terminal of the (meth)acrylate polymer skeleton. By having the moiety including an acidic group in the terminal side of the (meth)acrylate polymer skeleton, it is possible to prevent the viscosity of the curable resin composition from increasing due to the acidic polymer.

The above-described acidic polymer more preferably has the moiety including the above-described acidic group at the terminal of the polymer chain, and still more preferably has the moiety including the acidic group only in the terminal side of any one of the above-described (meth)acrylate polymer skeletons.

In a case where two or more (meth)acrylate polymer skeletons are included in one molecule of the acidic polymer, it is preferable that all (meth)acrylate polymer skeletons have the moiety including an acidic group in at least one terminal side of the (meth)acrylate polymer skeleton, and it is more preferable that all (meth)acrylate polymer skeletons have the moiety including an acidic group only in the terminal side of any one of the (meth)acrylate polymer skeletons.

It is more preferable that the acidic polymer include the acidic group only in the (meth)acrylate polymer skeleton, and it is still more preferable that the above-described (meth)acrylate polymer skeleton is linear and has the moiety including an acidic group only at one terminal thereof. As a result, it is possible to prevent an increase in viscosity of the curable resin composition.

The above-described acidic polymer preferably has a structural portion represented by General Formula (PA) as a structural portion including the above-described acidic group.

General Formula (PA)

$$(A^P)_x—LL—S—*$$

In the formula, $A^P$ represents an acidic group, LL represents a single bond or an (x+1)-valent linking group, and x represents an integer of 1 to 10. * represents a bonding position with the rest of the acidic polymer.

The acidic group which can be adopted as $A^P$ has the same meaning as the acidic group described in the above acidic polymer, and the preferred aspect thereof is also the same.

Examples of the (x+1)-valent linking group which can be adopted as LL include an (x+1)-valent saturated fatty acid hydrocarbon group (group obtained by removing x+1 hydrogen atoms from alkane) and an (x+1)-valent alicyclic hydrocarbon group (group obtained by removing x+1 hydrogen atoms from alicyclic hydrocarbon). In addition, examples thereof include an (x+1)-valent group consisting of a combination of these groups and a bond selected from —O—, —(C═O)—O—, or —(C═O)—NH—.

The number of carbon atoms in the (x+1)-valent saturated fatty acid hydrocarbon group which can be adopted as LL is preferably 1 to 10, more preferably 1 to 7, and still more preferably 1 to 5.

LL is preferably the (x+1)-valent saturated fatty acid hydrocarbon group or a group consisting of a combination of the (x+1)-valent saturated fatty acid hydrocarbon group and —O—.

x is preferably an integer of 2 to 8, more preferably an integer of 2 to 4, and still more preferably an integer of 2.

The structure represented by General Formula (PA) is preferably a structure represented by General Formula (PA1), and from the viewpoint of improving the adsorptivity to the core-shell ITO particles by having a carboxy group in the adjacent site, more preferably a structure represented by Formula (PA2).

General Formula (PA1)

$$(HOOC)_x—LL—S—*$$

Formula (PA2)

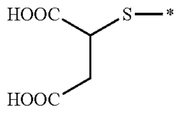

LL and x in the formulae have the same meaning as LL and x in General Formula (PA) described above. * represents a bonding position with the rest of the acidic polymer.

The number of structures represented by Formula (PA), (PA1), or (PA2) included in the acidic polymer is preferably 1 to 4.

The acid value of the acidic polymer is preferably 2.0 mgKOH/g or more and less than 100 mgKOH/g, and more preferably 2.0 mgKOH/g or more and less than 70 mgKOH/g. The acid value means the number in mg of potassium hydroxide required to neutralize acid components present in 1 g of the acidic polymer.

By adjusting the molecular weight of the acidic polymer and the number of acidic groups such as a carboxy group so that the acid value of the acidic polymer is within the above-described preferred range, it is possible to achieve both appropriate viscosity and particle dispersion performance as the curable resin composition. In a case where the acid value of the acidic polymer is 2.0 mgKOH/g or more, the acidic polymer can be sufficiently adsorbed and dispersed on the core-shell ITO particles. In addition, in a case where the acid value of the acidic polymer is less than 100 mgKOH/g, the number and the molecular size of adsorptive groups can be adjusted to adjust the viscosity of the curable resin composition to an appropriate range.

Preferred examples of the acidic polymer include an acidic polymer having a structure represented by General Formula (1).

$$(R^1—S\text{-}L^2)_n\text{-}L^1\text{-}(L^3\text{-}A\text{-}R^2)_m \quad (1)$$

In the formula, $R^1$ has the same meaning as $-LL-(A^P)_x$ in General Formula (PA) described above, and A represents the (meth)acrylate polymer skeleton represented by General Formula (P).

$R^2$ represents a hydrogen atom or a substituent not including an acidic group, $L^1$ represents a single bond or an (m+n)-valent linking group, and $L^2$ and $L^3$ represent a single bond or a divalent linking group.

m is an integer in a range of 1 to 8, and n is an integer in a range of 1 to 9. However, m+n satisfies 2 to 6.

Preferred examples of $R^1$ include an alkyl group substituted with a carboxy group, and an alkyl group having 1 to 10 carbon atoms and substituted with 2 to 4 carboxy groups is more preferable, an alkyl group having 1 to 7 carbon atoms and substituted with 2 or 3 carboxy groups is still more preferable, and an alkyl group having 1 to 5 carbon atoms and substituted with 2 carboxy groups is particularly preferable. Among these, the above-described structure represented by Formula (PA2) is preferable.

$R^2$ is preferably a hydrogen atom.

Examples of the (m+n)-valent linking group which can be adopted as $L^1$ include a group formed by removing any (m+n) hydrogen atoms in a linear or branched alkane and the following groups.

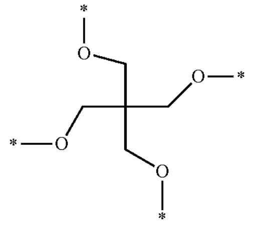

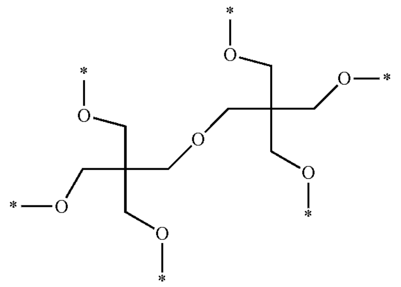

Examples of the divalent linking group which can be adopted as $L^2$ and $L^3$ include an alkylene group having 1 to 10 carbon atoms, and a group in which, in an alkylene group having 1 to 10 carbon atoms, any one or two or more non-adjacent —$CH_2$— are substituted with —O—, —S—, —C(═O)—, —OC(═O)—, —C(═O)O—, —OC(═O)O—, —NHC(═O)—, —C(═O)NH—, —OC(═O)NH—, —NHC(═O)O—, —SC(═O)—, or —C(═O)S—.

The weight-average molecular weight of the acidic polymer is preferably 1000 to 20000, more preferably 1000 to 15000, and still more preferably 1000 to 7000. By setting the weight-average molecular weight of the acidic polymer to 1000 or more, it is possible to suppress mixing of bubbles generated during curing the curable resin composition. In addition, by setting the weight-average molecular weight of the acidic polymer to the above-described preferred upper limit value or less, the fluidity is less likely to decrease even in a case where an amount necessary for dispersing the core-shell ITO particles is added to the curable resin composition, and even in a case of forming a diffraction grating shape, it is difficult for air to enter level difference of the mold and gaps are unlikely to occur.

Specific examples of the acidic polymer include compounds having the following structures. In the following structural formulae, one terminal ($R^2$ in General Formula (1)) of the (meth)acrylate polymer skeleton is a hydrogen atom. m and n have the same meaning as m and n in the General Formula (1) described above.

P-1~3

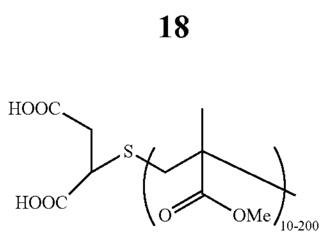

P-5

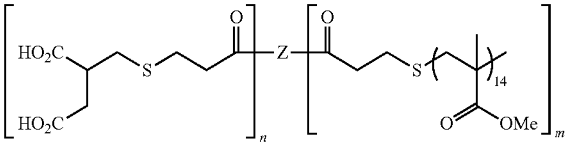

m + n = 5

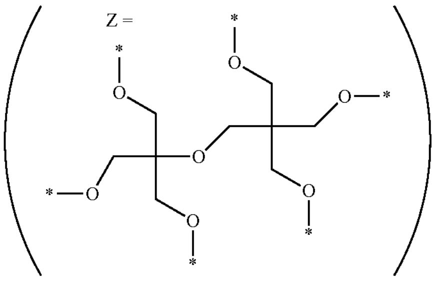

P-6

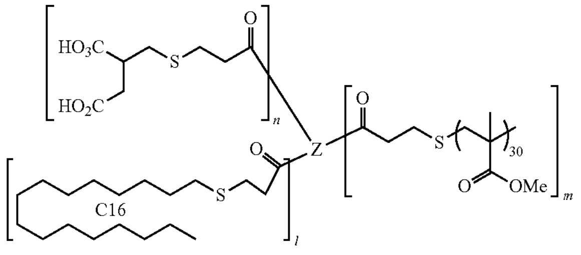

l + m + n = 6

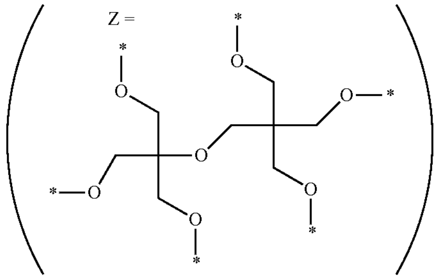

The above-described polymer dispersant can be produced by a conventional method. For example, the polymer dispersant can be produced by a reaction between a (meth) acrylate monomer and a compound capable of terminating the polymerization reaction of this monomer and having an acidic group. Examples of such compounds include mercaptosuccinic acid, mercaptooxalic acid, and mercaptomalonic acid, and mercaptosuccinic acid is preferable. Furthermore, a structure having a plurality of the (meth)acrylate polymer skeletons in one molecule can be obtained by adding and reacting a polyol mercapto alkylate or the like. In addition, with regard to a polymer dispersant having a phosphonooxy group at one terminal, a method described in JP1994-20261A (JP-H6-20261A) can be referred to.

In the curable resin composition, the content of the acidic polymer is preferably 5 to 50 parts by mass, more preferably 5 to 30 parts by mass, still more preferably 5 to 25 parts by mass, and particularly preferably 5 to 20 parts by mass with respect to 100 parts by mass of the content of the core-shell ITO particles. By setting the content ratio to the above-described preferred range, it is possible to suppress the mixing of bubbles generated during curing while stably dispersing the core-shell ITO particles in the curable resin composition.

(Meth)Acrylate Compound

The curable resin composition according to the embodiment of the present invention contains a monofunctional or higher (meth)acrylate compound. The monofunctional or higher (meth)acrylate compound means a compound having one or more (meth)acryloyl groups as a functional group, and in the present invention, is also simply referred to as a "(meth)acrylate compound".

The (meth)acrylate compound may be monofunctional or higher, and the number of functional groups is not particularly limited and can be, for example, 8 or less.

Specific examples of the monofunctional or bifunctional (meth)acrylate compound include the following monomer 1 (phenoxyethyl acrylate), monomer 2 (benzyl acrylate), monomer 3 (tricyclodecanedimethanol diacrylate), and monomer 4 (dicyclopentanyl acrylate). In addition, specific examples thereof include M-1 (1,6-hexanediol diacrylate), M-2 (1,6-hexanediol dimethacrylate), M-3 (benzyl acrylate), M-4 (isobornyl methacrylate), M-5 (dicyclopentanyl methacrylate), M-6 (dodecyl methacrylate), M-7 (2-ethylhexyl methacrylate), M-8 (2-hydroxyethyl acrylate), M-9 (hydroxypropyl acrylate), and M-10 (4-hydroxybutyl acrylate).

Monomer 1

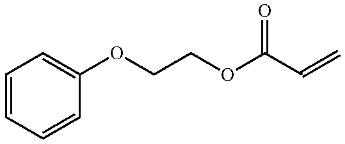

Monomer 2

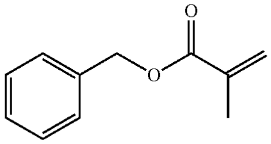

Monomer 3

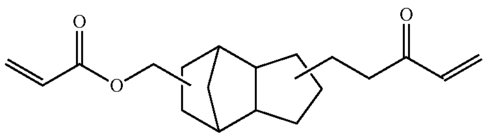

Monomer 4

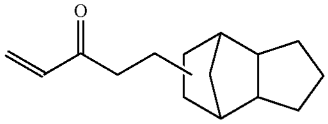

(M-1)

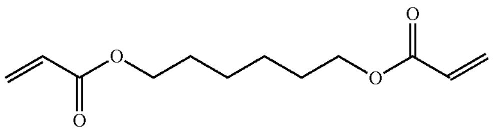

-continued (M-2)

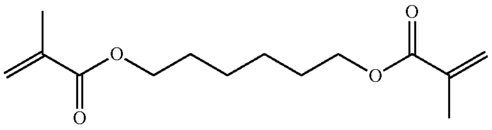

(M-3)

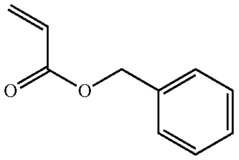

(M-4)

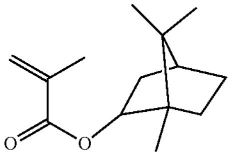

(M-5)

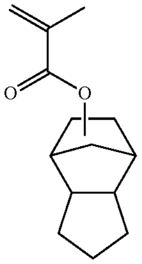

(M-6)

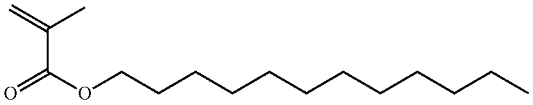

(M-7)

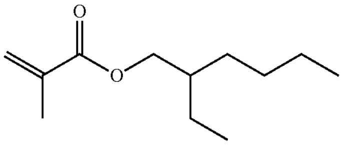

(M-8)

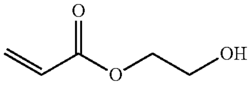

(M-9)

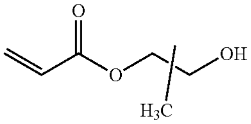

(M-10)

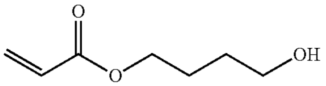

A method for obtaining the (meth)acrylate compound is not particularly limited, and the (meth)acrylate compound may be obtained commercially or may be synthesized by a conventional method.

In a case of being obtained commercially, for example, Viscoat #192 PEA (monomer 1 described above) (manufactured by OSAKA ORGANIC CHEMICAL INDUSTRY LTD.), Viscoat #160 BZA (monomer 2 described above) (manufactured by OSAKA ORGANIC CHEMICAL INDUSTRY LTD.), Lightester Bz (monomer 2 described above) (manufactured by KYOEISHA CHEMICAL Co., LTD.), A-DCP (monomer 3 described above) (manufactured by Shin-Nakamura Chemical Co., Ltd.), FA-513AS (monomer 4 described above) (manufactured by Hitachi Chemical Co., Ltd.), A-HD-N(M-1 described above) (manufactured by Shin-Nakamura Chemical Co., Ltd.), HD-N(M-2 described above) (manufactured by Shin-Nakamura Chemical Co., Ltd.), FA-BZA (M-3 described above) (manufactured by Hitachi Chemical Co., Ltd.), Lightester IB-X (M-4 described above) (manufactured by KYOEISHA CHEMICAL Co., LTD.), FA-513M (M-5 described above) (manufactured by Hitachi Chemical Co., Ltd.), Lightester L (M-6 described above) (manufactured by KYOEISHA CHEMICAL Co., LTD.), 2EHA (M-7 described above) (manufactured by TOAGOSEI CO., LTD.), HEA (M-8 described above) (manufactured by OSAKA ORGANIC CHEMICAL INDUSTRY LTD.), Lightester HOP-A(N) (M-9 described above) (manufactured by KYOEISHA CHEMICAL Co., LTD.), or 4-HBA (M-10 described above) (manufactured by OSAKA ORGANIC CHEMICAL INDUSTRY LTD.) can be preferably used.

In addition, in a case where it is necessary to increase the hardness and rub resistance of the surface of the cured product, the curable resin composition preferably includes a polyfunctional (meth)acrylate compound having three or more (meth)acryloyl groups in the molecule. By including a polyfunctional (meth)acrylate compound having three or more (meth)acryloyl groups in the molecule, the crosslink density of the cured product can be effectively improved, so that the surface hardness and rub resistance can be increased while maintaining a high partial dispersion ratio. The upper limit of the number of (meth)acryloyl groups in the polyfunctional (meth)acrylate compound having three or more (meth)acryloyl groups in the molecule is not particularly limited, but is preferably 8 or less and more preferably 6. In a case of being obtained commercially, for example, A-TMPT (monomer 5), A-TMMT (monomer 6), AD-TMP (monomer 7), and A-DPH (monomer 8) (all manufactured by Shin-Nakamura Chemical Co., Ltd.) can be preferably used.

Monomer 5

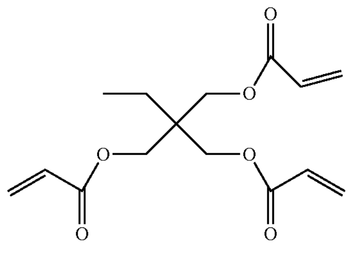

Monomer 6

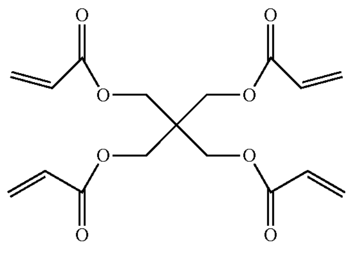

-continued

Monomer 7

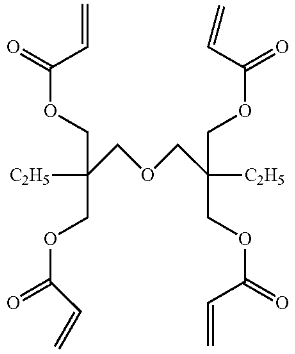

Monomer 8

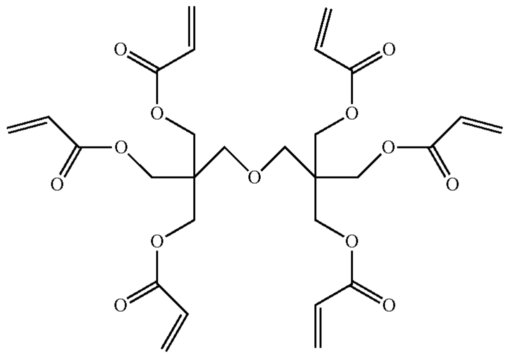

In addition to the above, examples thereof include (meth) acrylate monomers described in paragraphs 0037 to 0046 of JP2012-107191A.

The molecular weight of the (meth)acrylate compound is preferably 100 to 500.

The content of the (meth)acrylate compound in the curable resin composition according to the embodiment of the present invention is preferably 1% to 50% by mass, more preferably 2% to 40% by mass, and still more preferably 3% to 30% by mass. The amount of (meth)acrylate compound in the curable resin composition can be adjusted to adjust the function of the cured product to relieve stress in a case of thermal change.

In particular, in a case where it is necessary to increase the surface hardness and rub resistance of the cured product, the curable resin composition includes the polyfunctional (meth)acrylate compound having three or more (meth)acryloyl groups in the molecule in an amount of preferably 5% to 50% by mass, more preferably 10% to 45% by mass, and still more preferably 25% to 40% by mass with respect to the total mass (in a case of including a solvent, a mass of solid content excluding the solvent) of the curable resin composition.

Other Components

The curable resin composition according to the embodiment of the present invention may include other components in addition to the core-shell ITO particles, the dispersant, and the (meth)acrylate compound. Specific examples of the other components include the following polymerization initiator. In addition, a polymer described in paragraphs "0099" to "0108" of WO2020/171197A may be contained.

Polymerization Initiator

The curable resin composition according to the embodiment of the present invention preferably includes, as a polymerization initiator, at least one selected from a thermal radical polymerization initiator or a photoradical polymerization initiator.

Thermal Radical Polymerization Initiator

The curable resin composition according to the embodiment of the present invention preferably includes a thermal radical polymerization initiator. By the action of this thermal radical polymerization initiator, a cured product having high heat resistance can be molded by thermally polymerizing the curable resin composition.

As the thermal radical polymerization initiator, a compound usually used as a thermal radical polymerization initiator can be appropriately used according to conditions of a thermopolymerization (heat curing) step described later. Examples thereof include organic peroxides, and specifically, the following compounds can be used.

Examples thereof include 1,1-di(t-hexylperoxy) cyclohexane, 1,1-di(t-butylperoxy) cyclohexane, 2,2-di(4,4-di-(t-butylperoxy)cyclohexyl) propane, t-hexylperoxyisopropyl monocarbonate, t-butylperoxy-3,5,5-trimethylhexanoate, t-butylperoxylaurate, dicumyl peroxide, di-t-butyl peroxide, t-butylperoxy-2-ethylhexanoate, t-hexylperoxy-2-ethylhexanoate, cumene hydroperoxide, t-butyl hydroperoxide, t-butylperoxy-2-ethylhexyl, and 2,3-dimethyl-2,3-diphenylbutane.

In a case of including a thermal radical polymerization initiator, the content of the thermal radical polymerization initiator in the curable resin composition according to the embodiment of the present invention is preferably 0.01% to 10% by mass, more preferably 0.05% to 5.0% by mass, and still more preferably 0.05% to 2.0% by mass.

Photoradical Polymerization Initiator

The curable resin composition according to the embodiment of the present invention preferably includes a photoradical polymerization initiator. As the photoradical polymerization initiator, a compound usually used as a photoradical polymerization initiator can be appropriately used according to conditions of a photopolymerization (photocuring) step described later, and specifically, the following compounds can be used.

Examples thereof include bis(2,6-dimethoxybenzoyl)-2,4,4-trimethylpentyl phosphine oxide, bis(2,6-dimethylbenzoyl)-2,4,4-trimethylpentyl phosphine oxide, bis(2,4,6-trimethylbenzoyl)-2,4,4-trimethylpentyl phosphine oxide, bis(2,6-dichlorobenzoyl)-2,4,4-trimethylpentyl phosphine oxide, 1-phenyl-2-hydroxy-2-methylpropan-1-one, 1-hydroxycyclohexyl phenylketone, 1-(4-isopropylphenyl)-2-hydroxy-2-methylpropan-1-one, 1,2-diphenylethanedione, methylphenyl glyoxylate, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2,2-dimethoxy-1,2-diphenylethan-1-one, 2-methyl-1-(4-methylthiophenyl)-2-morpholinopropan-1-one, 2-benzyl-2-dimethylamino-1-(4-morpholinophenyl)-butanone-1,2,4,6-trimethylbenzoyl-diphenyl-phosphine oxide, and bis(2,4,6-trimethylbenzoyl)-phenylphosphine oxide.

Among these, in the present invention, as the photoradical polymerization initiator, 1-hydroxycyclohexylphenylketone (for example, Irgacure 184 (product name) manufactured by BASF), bis(2,4,6-trimethylbenzoyl)-phenylphosphine oxide (for example, Irgacure 819 (product name) manufactured by BASF), 2,4,6-trimethylbenzoyl-diphenyl-phosphinoxide (for example, Irgacure TPO (product name) manufactured by BASF), 2,2,-dimethoxy-1,2-diphenylethan-1-one (for example, Irgacure 651 (product name) manufactured by BASF), 1-[4-(2-hydroxyethoxy)-phenyl]-2-hydroxy-2-methyl-1-propan-1-one, or 2-methyl-1-(4-methylthiophenyl)-2-morpholinopropan-1-one can be preferably used.

In a case of including a photoradical polymerization initiator, the content of the photoradical polymerization initiator in the curable resin composition according to the embodiment of the present invention is preferably 0.01% to 5.0% by mass, more preferably 0.05% to 1.0% by mass, and still more preferably 0.05% to 0.5% by mass.

The curable resin composition preferably includes both photoradical polymerization initiator and thermal radical polymerization initiator. In this case, the total content of the photoradical polymerization initiator and the thermal radical polymerization initiator in the above-described curable resin composition is preferably 0.01% to 5% by mass, more preferably 0.05% to 1.0% by mass, and still more preferably 0.05% to 0.5% by mass.

Other Additives and the Like

The curable resin composition according to the embodiment of the present invention may include additives such as a polymer or a monomer other than the above-described components, a dispersant, a plasticizer, a heat stabilizer, a release agent, or the like within a range where the effects of the present invention are exhibited.

Properties and the Like of Curable Resin Composition

The viscosity of the curable resin composition according to the embodiment of the present invention is preferably 5000 mPa·s or less, more preferably 3000 mPa·s or less, still more preferably 2500 mPa·s or less, and particularly preferably 2000 mPa·s or less. By setting the viscosity of the curable resin composition within the above-described range, handleability in a case of molding a cured product can be improved, and a cured product having high quality can be formed. The viscosity of the curable resin composition is preferably 50 mPa·s or more, more preferably 100 mPa·s or more, still more preferably 200 mPa·s or more, and particularly preferably 500 mPa·s or more.

Use of Curable Resin Composition

The use of the curable resin composition according to the embodiment of the present invention is not particularly limited, but is it preferably used as a material for producing a diffractive optical element. In particular, the curable resin composition according to the embodiment of the present invention is used as a material for producing a low refractive index and low Abbe number diffractive optical element in a multilayer diffractive optical element, and can provide excellent diffraction efficiency.

Cured Product

The cured product according to an embodiment of the present invention is formed from the curable resin composition according to the embodiment of the present invention. A cured product is obtained by polymerizing a polymerizable compound such as a (meth)acrylate compound, but the cured product according to the embodiment of the present invention may include an unreacted monomer.

The cured product obtained by curing the curable resin composition according to the embodiment of the present invention is transparent from visible light to the shortwave infrared wavelength region (approximately 600 to 1600 nm), and a refractive index at a wavelength of 656.27 nm and a refractive index at a wavelength of 1550 nm are both low as described later.

For example, in a case where the cured product is formed as a sheet having a thickness of 6 μm, a value of 90% or more can be obtained as a transmittance at the wavelength of 656.27 nm and a value of 40% or more, preferably 45% or more and more preferably 50% or more, can be obtained as a transmittance at the wavelength of 1550 nm. The transmittance means a value measured using a spectrophotometer (for example, a spectrophotometer "V-670" manufactured by JASCO Corporation).

The refractive index of the cured product obtained by curing the curable resin composition according to the embodiment of the present invention at the wavelength of 656.27 nm is preferably 1.45 to 1.60 and more preferably 1.50 to 1.55.

The refractive index of the cured product obtained by curing the curable resin composition according to the embodiment of the present invention at the wavelength of 1550 nm is preferably 1.35 to 1.55 and more preferably 1.40 to 1.50.

A birefringence Δn of the cured product of the curable resin composition according to the embodiment of the present invention (in the present invention, also referred to as a birefringence Δn(587 nm)) at a wavelength of 587 nm is preferably 0.00≤Δn≤0.01. The birefringence Δn(587 nm) is more preferably 0.001 or less and still more preferably less than 0.001. The lower limit value of the birefringence Δn(587 nm) may be 0.00001 or 0.0001.

The birefringence Δn(587 nm) of the cured product can be determined by the following method. A film-shaped sample is produced, and using a birefringence evaluation device (for example, product name: WPA-100, manufactured by Photonic Lattice, Inc.), a birefringence within a 10 mm diameter circle including the center of the sample is measured. Thereafter, the birefringence Δn(587 nm) can be obtained by obtaining the average value of birefringence at a wavelength of 587 nm.

Method for Producing Cured Product

The cured product according to the embodiment of the present invention can be produced by photocuring the curable resin composition according to the embodiment of the present invention by light irradiation, or by heat-curing the curable resin composition according to the embodiment of the present invention by heating. It is preferable that the above-described photoradical polymerization initiator is contained in the curable resin composition in a case of photocuring, or the above-described thermal radical polymerization initiator is contained in the curable resin composition in a case of heat-curing.

As for the photocuring conditions, a description of light irradiation in a diffractive optical element described later can be preferably applied.

In the heat curing, the heating temperature can be, for example, 150° C. or higher, and is preferably 160° C. to 270° C., more preferably 165° C. to 250° C., and still more preferably 170° C. to 230° C. During heating, pressurization may be performed together with the heating. The pressure in a case of pressurization is preferably 0.098 MPa to 9.8 MPa, more preferably 0.294 MPa to 4.9 MPa, and still more preferably 0.294 MPa to 2.94 MPa.

The heat-curing time is preferably 30 to 1000 seconds, more preferably 30 to 500 seconds, and still more preferably 60 to 300 seconds. The atmosphere during the heat curing (thermopolymerization) is preferably an atmosphere replaced with air or an inert gas, and more preferably an atmosphere in which air is replaced with nitrogen until the oxygen concentration is 1% or less.

Diffractive Optical Element

The diffractive optical element according to an embodiment of the present invention is a diffractive optical element including a surface which has a diffraction grating shape formed of the cured product according to the embodiment of the present invention, and is formed by curing the curable resin composition according to the embodiment of the present invention.

The diffractive optical element according to the embodiment of the present invention preferably has a maximum thickness of 2 μm to 100 μm. The maximum thickness is more preferably 2 μm to 50 μm and particularly preferably 2 μm to 30 μm. In addition, a level difference (lattice thickness) of the diffraction grating shape (periodic structure) included in the diffractive optical element is preferably 1 μm to 100 μm and more preferably 1 μm to 50 μm. Furthermore, it is sufficient that a pitch of the diffraction grating shape included in the diffractive optical element is in a range of 0.1 mm to 10 mm, and it is preferable that the pitch is changed according to the required optical aberration in the same diffractive optical element.

The diffractive optical element can be produced according to, for example, the following procedure.

The curable resin composition is sandwiched between a surface of a mold, which is processed into a diffraction grating shape, and a transparent substrate. Thereafter, the curable resin composition may be pressurized and stretched to a desired range. In the sandwiched state, the curable resin composition is irradiated with light from the transparent substrate side to cure the curable resin composition. Thereafter, the cured product is released from the mold. After the mold release, the cured product may be further irradiated with light from the side opposite to the transparent substrate side.

Examples of the transparent substrate include a flat glass, and a flat transparent resin (such as (meth)acrylic resin, polycarbonate resin, and polyethylene terephthalate).

The transparent substrate used in the above-described production may be included in the diffractive optical element as it is, or may be peeled off The surface of the mold, which is processed into a diffraction grating shape, is preferably a chromium nitride-treated surface. As a result, good mold releasability can be obtained, and the producing efficiency of the diffractive optical element can be improved.

Examples of the chromium nitride treatment include a method for forming a chromium nitride film on the mold surface. As the method for forming a chromium nitride film on the mold surface, a chemical vapor deposition (CVD) method and a physical vapor deposition (PVD) method can be exemplified. The CVD method is a method in which a raw material gas including chromium and a raw material gas including nitrogen are reacted at a high temperature to form a chromium nitride film on a surface of a base substance. In addition, the PVD method is a method (arc-type vacuum vapor deposition method) for forming a chromium nitride film on a surface of a base substance using arc discharge. The arc-type vacuum vapor deposition method is a method for forming a film of a compound by reacting ionized metals with a reaction gas on the surface of the base substance. Specifically, a cathode (evaporation source) formed with, for example, chrome in a vacuum container, is disposed, arc discharge occurs between the cathode and a wall surface of the vacuum container through a trigger, ionization of metal by arc plasma is performed at the same time of evaporating the cathode, a negative voltage is applied to the base substance, and a reaction gas (for example, nitrogen gas) is introduced into the vacuum container at approximately several tens mTorr (1.33 Pa).

As the light used for the light irradiation curing the curable resin composition, ultraviolet light or visible light preferable and ultraviolet light is more preferable. For example, a metal halide lamp, a low pressure mercury lamp, a high pressure mercury lamp, an ultra-high pressure mercury lamp, a germicidal lamp, a xenon lamp, a light emitting diode (LED) light source lamp, and the like are suitably used. The illuminance of ultraviolet light used for the light irradiation curing the curable resin composition is preferably 1 to 100 $mW/cm^2$, more preferably 1 to 75 $mW/cm^2$, and still more preferably 5 to 50 $mW/cm^2$. The curable resin composition may be irradiated with ultraviolet light having different illuminance multiple times. The exposure amount of ultraviolet light is preferably 0.4 to 10 $J/cm^2$, more preferably 0.5 to 5 $J/cm^2$, and still more preferably 1 to 3 $J/cm^2$. The atmosphere during the light irradiation is preferably an atmosphere replaced with air or an inert gas, and more preferably an atmosphere in which air is replaced with nitrogen until the oxygen concentration is 1% or less.

Multilayer Diffractive Optical Element

The multilayer diffractive optical element according to an embodiment of the present invention includes a first diffractive optical element and a second diffractive optical element, in which the first diffractive optical element is a diffractive optical element formed of the cured product according to the embodiment of the present invention, and the surface of the first diffractive optical element, which has a diffraction grating shape, and a surface of the second diffractive optical element, which has a diffraction grating shape, face each other. It is preferable that the surfaces having the diffraction grating shapes are in contact with each other.

It is preferable that a multilayer diffractive optical element is formed by including, as a first diffractive optical element, the diffractive optical element formed by curing the curable resin composition according to the embodiment of the present invention, and further overlapping a second diffractive optical element formed of a different material such that the first diffractive optical element and the second diffractive optical element face each other in lattice-shaped surfaces. In this case, it is preferable that the lattice-shaped surfaces are in contact with each other.

By forming the second diffractive optical element with a material having a higher refractive index and higher Abbe number than the first diffractive optical element, it is possible to suppress the occurrence of flare, and the like, and sufficiently utilize a chromatic aberration reducing effect of the multilayer diffractive optical element.

The refractive index of the second diffractive optical element at the wavelength of 656.27 nm is preferably 1.55 to 1.70 and more preferably 1.56 to 1.65. In addition, the refractive index of the second diffractive optical element at the wavelength of 656.27 nm is larger than the refractive index of the first diffractive optical element simultaneously used in the multilayer diffractive optical element, that is, it is satisfied that the refractive index of the second diffractive optical element at the wavelength of 656.27 nm>the refractive index of the first diffractive optical element at the wavelength of 656.27 nm.

The refractive index of the second diffractive optical element at the wavelength of 1550 nm is preferably 1.55 to 1.70 and more preferably 1.56 to 1.65. In addition, the refractive index of the second diffractive optical element at the wavelength of 1550 nm is larger than the refractive index of the first diffractive optical element simultaneously used in the multilayer diffractive optical element, that is, it is satisfied that the refractive index of the second diffractive optical element at the wavelength of 1550 nm>the refractive index of the first diffractive optical element at the wavelength of 1550 nm.

The material for forming the second diffractive optical element is not particularly limited as long as a cured product having a high refractive index and a high Abbe number is obtained. For example, a curable resin composition including a (meth)acrylate monomer having a sulfur atom, a halogen atom, an aromatic ring structure, a curable resin composition including zirconium oxide and a (meth)acrylate monomer, and the like can be used.

The multilayer diffractive optical element can be produced according to, for example, the following procedure.

A material for forming the second diffractive optical element is sandwiched between a diffraction grating shape surface (surface obtained after the mold release) of a diffractive optical element formed by curing the curable resin composition according to the embodiment of the present invention, and a transparent substrate. Thereafter, the material may be pressurized and stretched to a desired range. In the sandwiched state, the material is irradiated with light from the transparent substrate side to cure the material. Thereafter, the cured product is released from the mold.

That is, as the multilayer diffractive optical element according to the embodiment of the present invention, it is preferable that the first diffractive optical element, the second diffractive optical element, and the transparent substrate are arranged in this order.

Examples of the transparent substrate include the same examples as the transparent substrate used in a case of producing the diffractive optical element (first diffractive optical element).

The transparent substrate used in the above-described production may be included in the multilayer diffractive optical element as it is, or may be peeled off.

The multilayer diffractive optical element preferably has a high diffraction efficiency. For example, the diffraction efficiency of the multilayer diffractive optical element with the primary light at the wavelength of 656.27 nm is preferably 50% or more, more preferably 80% or more, still more preferably 85% or more, and particularly preferably 95% or more. In addition, the diffraction efficiency of the multilayer diffractive optical element with the primary light at the wavelength of 1550 nm is preferably 90% or more and more preferably 95% or more.

In a case where the diffraction efficiency of the multilayer diffractive optical element with the primary light exhibits high diffraction efficiency at the above-described wavelengths of 656.27 nm and 1550 nm, unnecessary diffracted light can be sufficiently suppressed, and a high-performance lens can be realized.

The multilayer diffractive optical element preferably has a maximum thickness of 50 μm to 20 mm. The maximum thickness is more preferably 50 μm to 10 mm and particularly preferably 50 μm to 3 mm.

Lens

The diffractive optical element and multilayer diffractive optical element according to the embodiment of the present invention can be used as a lens, respectively.

A film or a member can be provided on the surface or the periphery of the lens depending on the environment in which the lens is used or the use of the lens. For example, a protective film, an anti-reflection film, a hard coat film, and the like can be formed on the surface of the lens. In addition, the lens can be used as a composite lens in which a glass lens or a plastic lens is laminated on the lens. Furthermore, the periphery of the lens can be fitted into a base material holding frame or the like, and fixed. However, these films, frames, and the like are members added to the lens, and are distinguished from the lens itself in the present specification.

The lens is preferably used as an image pick-up lens in a mobile phone, a digital camera, and the like, an imaging lens in a television, a video camera, and the like, and an in-vehicle lens.

EXAMPLES

Hereinafter, the present invention will be described in more detail based on Examples. The materials, amounts used, proportions, treatment details, treatment procedures, and the like described in the following examples can be appropriately modified as long as the gist of the invention is maintained. Therefore, the scope of the present invention should not be construed as being limited to the following specific examples. In the present invention, "room temperature" means 25° C.

Synthesis Example

ITO particles and a dispersant were synthesized as follows.

1. Synthesis of ITO Particles (1) Synthesis of Core-Shell ITO Particles (ITO-01)

First, 300 ml of oleic acid (manufactured by FUJIFILM Wako Pure Chemical Corporation), 42.475 g of indium acetate (manufactured by Kojundo Chemical Lab. Co., Ltd.), and 1.60 g of tin acetate (IV) (manufactured by Alfa Aesar) were charged into a flask, and the mixture was heated at 160° C. for 1 hour in an environment of nitrogen flow to obtain a yellow transparent precursor solution having a tin concentration of 3.0 at %.

In addition, 300 ml of oleic acid and 43.79 g of indium acetate were charged into another flask, and the mixture was heated at 160° C. for 1 hour in an environment of nitrogen flow to obtain a yellow transparent precursor solution having a tin concentration of 0 at %.

Each prepared precursor solution was filled in a gas tight syringe.

Subsequently, 65 ml of oleyl alcohol (manufactured by FUJIFILM Wako Pure Chemical Corporation) was charged into another flask, and heated at 285° C. in a nitrogen flow. 40 ml of the above-described precursor solution having a tin concentration of 3.0 at %, which was filled in the gas tight syringe, was added dropwise to the heated solvent at a rate of 1.75 ml/min using a syringe pump.

After the dropwise addition of the precursor solution having a tin concentration of 3.0 at % was completed, the mixture was held for 5 minutes, and then 70 ml of the precursor solution having a tin concentration of 0 at % was added dropwise thereto at a rate of 1.75 ml/min using a syringe pump. After the dropwise addition of the precursor solution having a tin concentration of 0 at % was completed, the heating was stopped, and the mixture was cooled to room temperature.

The obtained reaction solution was subjected to centrifugation so as to remove the supernatant, and redispersed in toluene. Thereafter, the series of operations of addition of ethanol, centrifugation, removal of the supernatant, and redispersion with toluene were repeated three times to obtain 75 ml of a toluene dispersion liquid of core-shell ITO particles (ITO-01) having an oleic acid coordination.

The concentration of solid contents of the dispersion liquid of the ITO particles (ITO-01) was 6% by mass, and the proportion of the surface modification component (oleic acid) to the solid content was 6% by mass.

Hereinafter, the concentration of solid contents of dispersion liquids of ITO nanoparticles (ITO-02) to (ITO-07) and the proportion of the surface modification component to the solid content are the same as those of the dispersion liquid of the ITO nanoparticles (ITO-01).

Method for Evaluating Concentration of Solid Contents 10 ml of the obtained dispersion liquid of ITO particles was collected and heated at 200° C. for 30 minutes in a glass petri dish on a hot plate, and the concentration of solid contents was calculated from the mass of the residue after heating and the mass of the dispersion liquid before heating.

(2) Synthesis of Homogeneously Doped ITO Particles (ITO-02)

First, 300 ml of oleic acid (manufactured by FUJIFILM Wako Pure Chemical Corporation), 42.475 g of indium acetate (manufactured by Kojundo Chemical Lab. Co., Ltd.), and 1.60 g of tin acetate (IV) (manufactured by Alfa Aesar) were charged into a flask, and the mixture was heated at 160° C. for 1 hour in an environment of nitrogen flow to obtain a yellow transparent precursor solution having a tin concentration of 3.0 at %.

Each prepared precursor solution was packed in a gas tight syringe.

Subsequently, 65 ml of oleyl alcohol (manufactured by FUJIFILM Wako Pure Chemical Corporation) was charged into another flask, and heated at 285° C. in a nitrogen flow. 110 ml of the above-described precursor solution having a tin concentration of 3.0 at %, which was filled in the gas tight syringe, was added dropwise to the heated solvent at a rate of 1.75 ml/min using a syringe pump.

After the dropwise addition of the precursor solution was completed, the heating was stopped, and the mixture was cooled to room temperature.

The obtained reaction solution was subjected to centrifugation so as to remove the supernatant, and redispersed in toluene. Thereafter, the series of operations of addition of ethanol, centrifugation, removal of the supernatant, and redispersion with toluene were repeated three times to obtain 75 ml of a toluene dispersion liquid of homogeneously doped ITO particles (ITO-02) having an oleic acid coordination.

(3) Synthesis of Core-Shell ITO Particles (ITO-03)

A gas tight syringe was previously filled with the precursor solution having a tin concentration of 3.0 at % and the precursor solution having a tin concentration of 0 at %, which were used for producing the core-shell ITO nanoparticles (ITO-01). 65 ml of oleyl alcohol was charged into a flask, and heated at 285° C. in a nitrogen flow. 20 ml of the above-described precursor solution having a tin concentration of 3.0 at %, which was filled in the gas tight syringe, was added dropwise to the heated solvent at a rate of 1.75 ml/min using a syringe pump. After the dropwise addition of the precursor solution having a tin concentration of 3.0 at % was completed, 20 ml of the precursor solution having a tin concentration of 0 at % was added dropwise thereto at a rate of 1.75 ml/min using a syringe pump. After the dropwise addition of the precursor solution having a tin concentration of 0 at % was completed, the heating was stopped, and the mixture was cooled to room temperature.

The obtained reaction solution was subjected to centrifugation so as to remove the supernatant, and redispersed in toluene. Thereafter, the series of operations of addition of ethanol, centrifugation, removal of the supernatant, and redispersion with toluene were repeated three times to obtain 37.5 ml of a toluene dispersion liquid of core-shell ITO particles (ITO-03) having an oleic acid coordination.

(4) Synthesis of Core-Shell ITO Particles (ITO-04)

A gas tight syringe was previously filled with a precursor solution having a tin concentration of 2.5 at % and a precursor solution having a tin concentration of 0.5 at %, which were prepared in the same manner as in the core-shell ITO nanoparticles (ITO-01), except that the ratio of indium acetate to tin acetate was changed in the preparation of the precursor solutions used for producing the core-shell ITO nanoparticles (ITO-01).

65 ml of oleyl alcohol was charged into a flask, and heated at 285° C. in a nitrogen flow. 40 ml of the above-described precursor solution having a tin concentration of 2.5 at %, which was filled in the gas tight syringe, was added dropwise to the heated solvent at a rate of 1.75 ml/min using a syringe pump. After the dropwise addition of the precursor solution having a tin concentration of 2.5 at % was completed, 70 ml of the precursor solution having a tin concentration of 0.5 at % was added dropwise thereto at a rate of 1.75 ml/min using a syringe pump. After the dropwise addition of the precursor solution having a tin concentration of 0.5 at % was completed, the heating was stopped, and the mixture was cooled to room temperature.

The obtained reaction solution was subjected to centrifugation so as to remove the supernatant, and redispersed in toluene. Thereafter, the series of operations of addition of ethanol, centrifugation, removal of the supernatant, and redispersion with toluene were repeated three times to obtain 75 ml of a toluene dispersion liquid of core-shell ITO particles (ITO-04) having an oleic acid coordination.

(5) Synthesis of Core-Shell ITO Particles (ITO-05)

A gas tight syringe was previously filled with a precursor solution having a tin concentration of 6.0 at %, which was prepared in the same manner as in the core-shell ITO nanoparticles (ITO-01), except that the ratio of indium acetate to tin acetate was changed in the preparation of the precursor solution used for producing the core-shell ITO nanoparticles (ITO-01), and the precursor solution having a tin concentration of 0 at %, which was used in the production of the core-shell ITO nanoparticles (ITO-01).

65 ml of oleyl alcohol was charged into a flask, and heated at 285° C. in a nitrogen flow. 20 ml of the above-described precursor solution having a tin concentration of 6.0 at %, which was filled in the gas tight syringe, was added dropwise to the heated solvent at a rate of 1.75 ml/min using a syringe pump. After the dropwise addition of the precursor solution having a tin concentration of 6.0 at % was completed, 90 ml of the precursor solution having a tin concentration of 0 at % was added dropwise thereto at a rate of 1.75 ml/min using a syringe pump. After the dropwise addition of the precursor solution having a tin concentration of 0 at % was completed, the heating was stopped, and the mixture was cooled to room temperature.

The obtained reaction solution was subjected to centrifugation so as to remove the supernatant, and redispersed in toluene. Thereafter, the series of operations of addition of ethanol, centrifugation, removal of the supernatant, and redispersion with toluene were repeated three times to obtain 75 ml of a toluene dispersion liquid of core-shell ITO particles (ITO-05) having an oleic acid coordination.

(6) Synthesis of Core-Shell ITO Particles (ITO-06)

A gas tight syringe was previously filled with a precursor solution having a tin concentration of 10.0 at %, which was prepared in the same manner as in the core-shell ITO nanoparticles (ITO-01), except that the ratio of indium acetate to tin acetate was changed in the preparation of the precursor solution used for producing the core-shell ITO nanoparticles (ITO-01), and the precursor solution having a tin concentration of 0 at %, which was used in the production of the core-shell ITO nanoparticles (ITO-01).

65 ml of oleyl alcohol was charged into a flask, and heated at 285° C. in a nitrogen flow. 12 ml of the above-described precursor solution having a tin concentration of 10.0 at %, which was filled in the gas tight syringe, was added dropwise to the heated solvent at a rate of 1.75 ml/min using a syringe pump. After the dropwise addition of the precursor solution having a tin concentration of 10.0 at % was completed, 98 ml of the precursor solution having a tin concentration of 0 at % was added dropwise thereto at a rate of 1.75 ml/min using a syringe pump. After the dropwise addition of the precursor solution having a tin concentration of 0 at % was completed, the heating was stopped, and the mixture was cooled to room temperature.

The obtained reaction solution was subjected to centrifugation so as to remove the supernatant, and redispersed in toluene. Thereafter, the series of operations of addition of ethanol, centrifugation, removal of the supernatant, and redispersion with toluene were repeated three times to obtain 75 ml of a toluene dispersion liquid of core-shell ITO particles (ITO-06) having an oleic acid coordination.

(7) Synthesis of Core-Shell ITO Particles (ITO-07)

A gas tight syringe was previously filled with a precursor solution having a tin concentration of 4.0 at %, which was prepared in the same manner as in the core-shell ITO nanoparticles (ITO-01), except that the ratio of indium acetate to tin acetate was changed in the preparation of the precursor solution used for producing the core-shell ITO nanoparticles (ITO-01), and the precursor solution having a tin concentration of 0%, which was used in the production of the core-shell ITO nanoparticles (ITO-01).

65 ml of oleyl alcohol was charged into a flask, and heated at 275° C. in a nitrogen flow. 25 ml of the above-described precursor solution having a tin concentration of 4.0 at %, which was filled in the gas tight syringe, was added dropwise to the heated solvent at a rate of 1.75 ml/min using a syringe pump. After the dropwise addition of the precursor solution having a tin concentration of 4.0 at % was completed, 85 ml of the precursor solution having a tin concentration of 0 at % was added dropwise thereto at a rate of 1.75 ml/min using a syringe pump. After the dropwise addition of the precursor solution having a tin concentration of 0 at % was completed, the heating was stopped, and the mixture was cooled to room temperature.

The obtained reaction solution was subjected to centrifugation so as to remove the supernatant, and redispersed in toluene. Thereafter, the series of operations of addition of ethanol, centrifugation, removal of the supernatant, and redispersion with toluene were repeated three times to obtain 75 ml of a toluene dispersion liquid of core-shell ITO particles (ITO-07) having an oleic acid coordination.

(8) Synthesis of Core-Shell ITO Particles (ITO-08)

A gas tight syringe was previously filled with a precursor solution having a tin concentration of 2.0 at %, which was prepared in the same manner as in the core-shell ITO nanoparticles (ITO-01), except that the ratio of indium acetate to tin acetate was changed in the preparation of the precursor solution used for producing the core-shell ITO nanoparticles (ITO-01), and the precursor solution having a tin concentration of 0 at %, which was used in the production of the core-shell ITO nanoparticles (ITO-01).

65 ml of oleyl alcohol was charged into a flask, and heated at 285° C. in a nitrogen flow. 20 ml of the above-described precursor solution having a tin concentration of 2.0 at %, which was filled in the gas tight syringe, was added dropwise to the heated solvent at a rate of 1.75 ml/min using a syringe pump. After the dropwise addition of the precursor solution having a tin concentration of 2.0 at % was completed, 90 ml of the precursor solution having a tin concentration of 0 at % was added dropwise thereto at a rate of 1.75 ml/min using a syringe pump. After the dropwise addition of the precursor solution having a tin concentration of 0 at % was completed, the heating was stopped, and the mixture was cooled to room temperature.

The obtained reaction solution was subjected to centrifugation so as to remove the supernatant, and redispersed in toluene. Thereafter, the series of operations of addition of ethanol, centrifugation, removal of the supernatant, and redispersion with toluene were repeated three times to obtain 75 ml of a toluene dispersion liquid of core-shell ITO particles (ITO-08) having an oleic acid coordination.

(9) Synthesis of Core-Shell ITO Particles (ITO-09)

A gas tight syringe was previously filled with a precursor solution having a tin concentration of 10.0 at %, which was prepared in the same manner as in the core-shell ITO nanoparticles (ITO-01), except that the ratio of indium acetate to tin acetate was changed in the preparation of the precursor solution used for producing the core-shell ITO nanoparticles (ITO-01), and the precursor solution having a tin concentration of 0 at %, which was used in the production of the core-shell ITO nanoparticles (ITO-01).

65 ml of oleyl alcohol was charged into a flask, and heated at 285° C. in a nitrogen flow. 7.2 ml of the above-described precursor solution having a tin concentration of 10.0 at %, which was filled in the gas tight syringe, was added dropwise to the heated solvent at a rate of 1.75 ml/min using a syringe pump. After the dropwise addition of the precursor solution having a tin concentration of 10.0 at % was completed, 40.8 ml of the precursor solution having a tin concentration of 0 at % was added dropwise thereto at a rate of 1.75 ml/min using a syringe pump. After the dropwise addition of the precursor solution having a tin concentration of 0 at % was completed, the heating was stopped, and the mixture was cooled to room temperature.

The obtained reaction solution was subjected to centrifugation so as to remove the supernatant, and redispersed in toluene. Thereafter, the series of operations of addition of ethanol, centrifugation, removal of the supernatant, and redispersion with toluene were repeated three times to obtain 40 ml of a toluene dispersion liquid of core-shell ITO particles (ITO-09) having an oleic acid coordination.

As a result of a depth direction analysis by TOF-SIMS described later, in all of the above-described core-shell ITO particles (ITO-01) and (ITO-03) to (ITO-09), the above-described absolute value of the difference of $C_{Sn \times Ave}$ and $C_{Sn\ Surface\ Min}$ satisfied the relationship of 1.0 at % or more, and in the above-described homogeneously doped ITO particles (ITO-02), the above-described absolute value of the difference of $C_{Sn \times Ave}$ and $C_{Sn\ Surface\ Min}$ was less than 1.0 at %.

ICP-MS analysis, depth direction analysis by TOF-SIMS, and TEM analysis were performed on each of the ITO particles produced above. In addition, ICP-MS analysis and TEM analysis were performed on the particles at a stage of producing the core portion in the step of producing the core-shell ITO particles. Based on these measurement results, the particle size, thickness of the shell portion, and tin concentrations of the core portion, the shell portion, and the whole particles were determined. These are summarized in Table 1.

The tin concentration of the shell portion was calculated from the particle size and tin concentration of the whole core-shell ITO particles, the thickness of the shell portion, and the particle size and tin concentration of the core portion.

Measurement A: TEM Analysis

The particle size of the ITO particles and the particle size of the core portion were calculated based on the above-mentioned method for measuring the particle size of ITO particles using JFM-ARM300F2 GRAND (product name, manufactured by JEOL Ltd.) as a TEM.

Measurement B: Depth Direction Analysis by TOF-SIMS

As described above, the thickness of the shell portion of the core-shell ITO particles was calculated by performing a tin concentration analysis in the depth direction using TOF.SIMS5 (product name, manufactured by ION-TOF).

In the TOF-SIMS measurement, the dispersion liquid of ITO particles was dropped onto an aluminum foil using a pipette and the dried product was used as a measurement sample, and the measurement was performed within a range of the measurement sample as a measurement area. The measurement sample was like a film formed by depositing the ITO particles.

In addition, using a sputter rate calculated by the TOF-SIMS measurement with a sputtered ITO film (transmittance at a wavelength of 550 nm: 84%, surface resistivity: 13.2 Wsq) as a standard sample, the horizontal axis in the depth direction analysis was converted from time to depth.

Measurement C: ICP-MS Analysis Using an Agilent 8900 triple quadrupole (product name, manufactured by Agilent Technologies, Inc.) as ICP-MS, the tin concentration of the whole particles and the tin concentration of the core portion were measured.

With regard to the tin concentration of the homogeneously doped ITO particles, the tin concentration of the whole particles was measured by the above-described method.

2. Synthesis of Dispersant (1) Synthesis of Dispersant (A-1)

24.0 g of methyl methacrylate (manufactured by FUJIFILM Wako Pure Chemical Corporation) and 1.80 g of mercaptosuccinic acid (manufactured by FUJIFILM Wako Pure Chemical Corporation) were dissolved in 28 mL of methyl ethyl ketone and heated to 70° C. under a nitrogen stream. The solution was added dropwise over 30 minutes to a solution in which 0.24 g of a polymerization initiator (V-65, manufactured by FUJIFILM Wako Pure Chemical Corporation) was dissolved in 12 mL of methyl ethyl ketone. After the completion of the dropwise addition, the reaction was further performed at 70° C. for 4.5 hours. After allowing to cool, the reaction solution was added dropwise to a cooled mixed solution of 200 mL of water and 600 mL of methanol, and the precipitated powdery substance was collected by filtration and dried to obtain 15 g of the following dispersant (A-1). The polymer dispersant (A-1) was substantially composed of a polymer having a carboxy group at one terminal.

The weight-average molecular weight of the obtained polymer was 5900 in terms of standard polystyrene according to a gel permeation chromatography (GPC) method, and the dispersity (Mw/Mn) was 1.70. In addition, in a case where the number in mg of potassium hydroxide required to neutralize free fatty acid present in 1 g of the obtained polymer was measured to obtain an acid value, the acid value was 24 mgKOH/g.

(A-1)

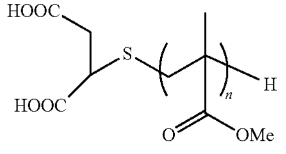

EXAMPLE

The toluene dispersion liquids of the ITO particles (ITO-01) to (ITO-09) were diluted with toluene in advance so that the concentration of solid contents was 4.75% by mass, and each curable resin composition was prepared as follows.

1. Preparation of Curable Resin Compositions 1-1 to 1-11

0.54 g of a dispersant (A-1) and 2.0 g of 1,6-hexanediol dimethacrylate (HDDMA, manufactured by TOKYO CHEMICAL INDUSTRY CO., LTD.) were added to 51.6 g of the toluene dispersion liquid of the ITO particles (ITO-01) prepared above to be dissolved. Toluene was distilled off by suction under reduced pressure while heating in a water bath at approximately 70° C. After the distillation, 0.01 g of IRGACURE 819 (product name, manufactured by BASF, photopolymerization initiator) was added to the obtained mixture and dissolved, thereby preparing a curable resin composition 1-1.

Same as the preparation of the curable resin composition 1-1, curable resin compositions 1-2 to 1-11 were prepared so as to have compositional ratios shown in the tables below.

2. Preparation of Curable Resin Composition 2

19.2 g of FA-512AS (product name, dicyclopentenyloxyethyl acrylate, manufactured by Hitachi Chemical Co., Ltd.) and 1.1 g of A9300-1CL (product name, manufactured by Shin-Nakamura Chemical Co., Ltd.) were added to 55.5 g of a zirconium oxide dispersion liquid (product name: SZR-K, manufactured by SAKAI CHEMICAL INDUSTRY CO., LTD.) and stirred until uniform. Methanol and methyl ethyl ketone (MEK) were distilled off by suction under reduced pressure while heating in a water bath at approximately 70° C. After the distillation, 0.40 g of IRGACURE 651 (product name, manufactured by BASF, photopolymerization initiator) was added to the obtained mixture and dissolved, thereby preparing a curable resin composition 2.

3. Production of Cured Products of Curable Resin Compositions 1-1 to 1-11

The curable resin composition 1-1 was sandwiched between hydrophobically treated glass plates, irradiated with ultraviolet light (UV) under the conditions of integrated light intensity of 1.0 J/cm$^2$ and illuminance of 30 mW/cm$^2$ using a UV irradiation device (product name: EXECURE 3000, manufactured by HOYA CANDEO OPTRONICS CORPORATION), and irradiated again with UV under the conditions of integrated light intensity of 1.0 J/cm$^2$ and illuminance of 5 mW/cm$^2$ to produce a cured product. The film thickness of the cured product obtained as described above was 6 μm.

Cured products of the curable resin compositions 1-2 to 1-11 were produced in the same manner as in the production of the cured product of the curable resin composition 1-1, except that the curable resin compositions 1-2 to 1-11 were used instead of the curable resin composition 1-1.

4. Production of Cured Product of Curable Resin Composition 2

The curable resin composition 2 was sandwiched between hydrophobically treated glass plates, irradiated with UV under the conditions of integrated light intensity of 2.0 J/cm$^2$ and illuminance of 5 mW/cm$^2$ using a UV irradiation device (product name: EXECURE 3000, manufactured by HOYA CANDEO OPTRONICS CORPORATION) to produce a cured product. The film thickness of the cured product obtained as described above was 6 μm.

Evaluation 1: Transmittance Measurement

With regard to each cured product of the curable resin compositions 1-1 to 1-11 produced under the above-described conditions, using a spectrophotometer (product name: V-670, manufactured by JASCO Corporation), transmittance in a wavelength of 400 to 1800 nm was measured, and a transmittance of the cured product was evaluated according to the following evaluation standard based on a transmittance % $T_{656}$ at 656.27 nm and a transmittance % $T_{1550}$ at 1550 nm. The evaluation "B-" or higher is practical, and "A" or higher is preferable. The results are shown in Table 1.

Evaluation Standard

A: % $T_{656}$ was 90% or more and % $T_{1550}$ was 50% or more.

B+: % $T_{656}$ was 90% or more and % $T_{1550}$ was 45% or more and less than 50%.

B−: % $T_{656}$ was 90% or more and % $T_{1550}$ was 40% or more and less than 45%.

C: % $T_{656}$ was 90% or more and % $T_{1550}$ was 30% or more and less than 40%.

D: % $T_{656}$ was 90% or more and % $T_{1550}$ was less than 30%.

E: % $T_{656}$ was less than 90% and % $T_{1550}$ was less than 30%.

Evaluation 2: Evaluation of Refractive Index

The refractive index of each of the cured products of the curable resin compositions 1-1 to 1-11 and the cured product of the curable resin composition 2 at wavelengths of 656.27 nm and 1550 nm was measured using a multi-wavelength Abbe refractometer DR-M2 (product name, manufactured by ATAGO CO., LTD.).

Each of the cured products of the curable resin compositions 1-1 to 1-11 has a refractive index nC at the wavelength of 656.27 nm of 1.45 to 1.60 and a refractive index at the wavelength of 1550 nm of 1.35 to 1.55.

The cured product of the curable resin composition 2 has a refractive index nC at the wavelength of 656.27 nm of 1.599 and a refractive index at the wavelength of 1550 nm of 1.587.

Evaluation 3: Evaluation of Diffraction Efficiency of Multilayer Diffractive Optical Element In a diffractive optical element shown in FIG. 2 of JP2008-241734A, any one of the above-described cured products of the curable resin compositions 1-1 to 1-11 was used as a first diffraction grating and the above-described cured product of the curable resin composition 2 was used as a second diffraction grating, and a diffraction efficiency of the multilayer diffractive optical element was evaluated in a case where a common lattice thickness of the first and second diffraction gratings was 9.6 μm.

For the diffraction efficiency, using expressions 23 and 24 of JP2008-241734 and values of the refractive index and lattice thickness measured in the above-described evaluation 2, the diffraction efficiencies with primary light at the wavelength of 656.27 nm and the wavelength of 1550 nm were calculated, respectively, and the diffraction efficiency of the multilayer diffractive optical element was evaluated according to the following evaluation standard. It can be said that the diffraction efficiency is good in a case of being "B" or higher. The results are shown in Table 1.

Evaluation Standard

A: diffraction efficiency at the wavelength of 656.27 nm was 95% or more, and the diffraction efficiency at the wavelength of 1550 nm was 95% or more.

B: diffraction efficiency at the wavelength of 656.27 nm was 85% or more and less than 95%, and the diffraction efficiency at the wavelength of 1550 nm was 95% or more.

C: diffraction efficiency at the wavelength of 656.27 nm was 85% or more and less than 95%, and the diffraction efficiency at the wavelength of 1550 nm was less than 95%.

D: diffraction efficiency at the wavelength of 656.27 nm was less than 85%, and the diffraction efficiency at the wavelength of 1550 nm was less than 95%.

TABLE 1

| | | Example 1 | Comparative Example 1 | Example 2 | Example 3 | Example 4 | Example 5 | Example 6 |
|---|---|---|---|---|---|---|---|---|
| Curable resin composition | | 1-1 | 1-2 | 1-3 | 1-4 | 1-5 | 1-6 | 1-7 |
| ITO particles | Type | ITO-01 | ITO-02 | ITO-01 | ITO-01 | ITO-03 | ITO-04 | ITO-05 |
| | Structure | Core-shell | Homogeneously doped | Core-shell | Core-shell | Core-shell | Core-shell | Core-shell |
| | Tin concentration of core portion [at %] | 3.0 | —*[1] | 3.0 | 3.0 | 3.0 | 2.5 | 6.0 |
| | Tin concentration of shell portion [at %] | 0 | | 0 | 0 | 0 | 0.5 | 0 |
| | Tin concentration of whole particles [at %] | 1.4 | 2.9 | 1.4 | 1.4 | 1.4 | 1.4 | 1.4 |
| | Particle size [nm] | 19 | 19 | 19 | 19 | 12 | 19 | 19 |
| | Thickness of shell portion [nm] | 2.0 | — | 2.0 | 2.0 | 1.5 | 2.0 | 3.5 |
| | Blending amount [wt %] | 49.0 | 49.0 | 49.0 | 49.0 | 49.0 | 49.0 | 49.0 |
| Dispersant | Type | A-1 | A-1 | Phosmer PP | BYK-111 | A-1 | A-1 | A-1 |
| | Blending amount [wt %] | 10.8 | 10.8 | 10.8 | 10.8 | 10.8 | 10.8 | 10.8 |
| (Meth)acrylate compound | Type | HDDMA | HDDMA | HDDMA | HDDMA | HDDMA | HDDMA | HDDMA |
| | Part by mass [wt %] | 40.0 | 40.0 | 40.0 | 40.0 | 40.0 | 40.0 | 40.0 |
| Photopolymerization initiator: IRGACURE 819 | Blending amount [wt %] | 0.2 | 0.2 | 0.2 | 0.2 | 0.2 | 0.2 | 0.2 |
| Transmittance of cured product | | A | D | A | A | B+ | A | B+ |
| Diffraction efficiency of multilayer diffractive optical element | | A | A | A | A | A | A | A |

*[1]Since it is homogeneously doped ITO particles, the tin concentration in the core portion and the shell portion is not described.

TABLE 1-2

| | | Example 7 | Example 8 | Example 9 | Example 10 |
|---|---|---|---|---|---|
| Curable resin composition | | 1-8 | 1-9 | 1-10 | 1-11 |
| ITO particles | Type | ITO-06 | ITO-07 | ITO-08 | ITO-09 |
| | Structure | Core-shell | Core-shell | Core-shell | Core-shell |
| | Tin concentration of core portion [at %] | 10.0 | 4.0 | 2.0 | 10.0 |
| | Tin concentration of shell portion [at %] | 0 | 0 | 0 | 0 |
| | Tin concentration of whole particles [at %] | 1.4 | 2.4 | 0.4 | 1.4 |
| | Particle size [nm] | 19 | 19 | 19 | 13 |
| | Thickness of shell portion [nm] | 4.3 | 3.0 | 2.0 | 1.5 |
| | Blending amount [wt %] | 49.0 | 49.0 | 49.0 | 49.0 |
| Dispersant | Type | A-1 | A-1 | A-1 | A-1 |
| | Blending amount [wt %] | 10.8 | 10.8 | 10.8 | 10.8 |
| (Meth)acrylate compound | Type | HDDMA | HDDMA | HDDMA | HDDMA |
| | Part by mass [wt %] | 40.0 | 40.0 | 40.0 | 40.0 |
| Photopolymerization initiator: IRGACURE 819 | Blending amount [wt %] | 0.2 | 0.2 | 0.2 | 0.2 |
| Transmittance of cured product | | B+ | A | B+ | B− |
| Diffraction efficiency of multilayer diffractive optical element | | A | A | A | A |

Note to Table

Each component in the tables is as follows.

ITO particles

ITO-01 to ITO-09: ITO particles (ITO-01) to (ITO-09) produced above

Dispersant

A-1: dispersant (A-1) produced above

Phosmer PP: product name, manufactured by Unichemical Co., Ltd.

BYK-111: DISPERBYK-111 (product name), polyester-polyether copolymer having a phosphoric acid group, manufactured by BYK (Meth)acrylate compound HDDMA: 1,6-hexanediol dimethacrylate Photopolymerization initiator Irgacure 819: product name, manufactured by BASF

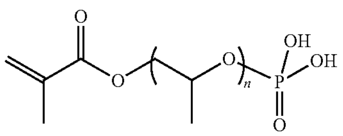

n = 5~6

Phosmer PP

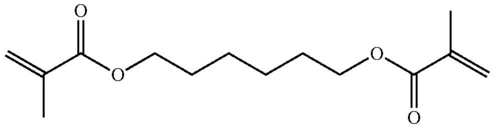

HDDMA

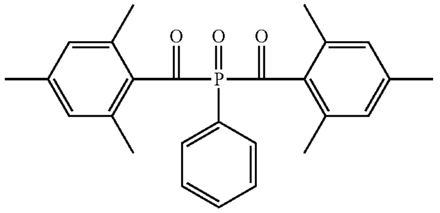

Irgacure 819

The unit of the blending amount is % by mass (also referred to as wt %), and the blending amount of the ITO particles is described by the solid content amount.

Both of the unit of the tin concentration of the core portion and the tin concentration of the shell portion are at %, and the unit of the particle size of the ITO particles and the thickness of the shell portion is nm.

From the results shown in Table 1, the following is found.

With the cured product obtained from the comparative curable resin composition 1-2 containing the homogeneously doped ITO particles which has a low transmittance of less than 30% at 1550 nm, a cured product which exhibits high transmittance over a visible light to shortwave infrared wavelength region while maintaining a wavelength dependence of a desired refractive index cannot be realized.

On the other hand, with the cured product obtained from any one of the curable resin compositions 1-1 and 1-3 to 1-11 according to the embodiment of the present invention, which contain the core-shell ITO particles, the monofunctional or higher (meth)acrylate compound, and the dispersant, a cured product which exhibits high transmittance over a visible light to shortwave infrared region while maintaining a wavelength dependence of a desired refractive index can be realized, and compared with the case of using the homogeneously doped ITO particles, the transmittance in the shortwave infrared wavelength region is excellent.

EXPLANATION OF REFERENCES

X: range from depth corresponding to radius of particle to depth corresponding to diameter of particle Y: depth which first shows same tin concentration as tin concentration of $0.95\times C_{Sn\times Ave}$ in case of being viewed from 0 nm in depth direction

What is claimed is:

1. A curable resin composition comprising:

particles which have a core-shell structure, in which a core portion is composed of indium tin oxide;

a monofunctional or higher functionality (meth) acrylate compound; and a dispersant, wherein a shell portion is composed of indium tin oxide having a tin concentration different from that of the core portion.

2. The curable resin composition according to claim 1, wherein a tin concentration of whole particles having the core-shell structure is 1.0 to 2.5 at %.

3. The curable resin composition according to claim 1, wherein an absolute value of a difference between a tin concentration of whole particles having the core-shell structure and the tin concentration of the shell portion is 0.5 at % or more.

4. The curable resin composition according to claim 1, wherein a tin concentration of the core portion is 1.5 to 8.0 at %.

5. The curable resin composition according to claim 1, wherein the tin concentration of the shell portion is less than 2.0 at %.

6. The curable resin composition according to claim 1, wherein a thickness of a shell portion is 0.5 to 3.0 nm.

7. The curable resin composition according to claim 1, wherein a content of the particles having the core-shell structure in the curable resin composition is 10% to 60% by mass.

8. The curable resin composition according to claim 1, wherein a particle size of the particles having the core-shell structure is 15 to 50 nm.

9. The curable resin composition according to claim 1, further comprising:

a photoradical polymerization initiator.

10. A cured product of the curable resin composition according to claim 1.

11. A diffractive optical element which is formed of the cured product according to claim 10, comprising:

a surface having a diffraction grating shape.

12. A multilayer diffractive optical element comprising:

a first diffractive optical element; and a second diffractive optical element, wherein the first diffractive optical element is the diffractive optical element according to claim 11, and the surface of the first diffractive optical element, which has a diffraction grating shape, and a surface of the second diffractive optical element, which has a diffraction grating shape, face each other.

13. The curable resin composition according to claim 1, wherein an absolute value of a difference between a tin concentration of whole particles having the core-shell structure and the tin concentration of the shell portion is 1.0 at % or more and 4.0 at % or less.

* * * * *